US012786369B2

(12) United States Patent
Huh et al.

(10) Patent No.: US 12,786,369 B2
(45) Date of Patent: Nov. 3, 2026

(54) STEREOSCOPIC IMAGE DISPLAY DEVICE

(71) Applicant: SAMSUNG DISPLAY CO., LTD., Yongin-si (KR)

(72) Inventors: Su Jung Huh, Yongin-si (KR); Rang Kyun Mok, Yongin-si (KR); Hyun Jin Cho, Yongin-si (KR); Eun Kyoung Nam, Yongin-si (KR); Byeong Hee Won, Yongin-si (KR); Young Soo Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 183 days.

(21) Appl. No.: 18/627,694

(22) Filed: Apr. 5, 2024

(65) Prior Publication Data

US 2024/0340402 A1 Oct. 10, 2024

(30) Foreign Application Priority Data

Apr. 7, 2023 (KR) ........................ 10-2023-0045867

(51) Int. Cl.

| | |
|---|---|
| ***H04N 13/341*** | (2018.01) |
| ***H04N 13/337*** | (2018.01) |
| ***H04N 13/398*** | (2018.01) |

(52) U.S. Cl.

CPC ......... *H04N 13/341* (2018.05); *H04N 13/337* (2018.05); *H04N 13/398* (2018.05)

(58) Field of Classification Search

CPC ... H04N 13/341; H04N 13/337; H04N 13/398

See application file for complete search history.

(56) References Cited

U.S. PATENT DOCUMENTS

2015/0042772 A1* 2/2015 Mukhtarov .......... H04N 13/398 348/58

FOREIGN PATENT DOCUMENTS

| | | | |
|---|---|---|---|
| KR | 10-2006-0096228 | A | 9/2006 |
| KR | 10-0784080 | B1 | 12/2007 |
| KR | 10-1122199 | B1 | 3/2012 |
| KR | 10-1212336 | B1 | 12/2012 |
| KR | 10-2014-0049363 | A | 4/2014 |

* cited by examiner

*Primary Examiner* — On S Mung

(74) *Attorney, Agent, or Firm* — F. CHAU & ASSOCIATES, LLC

(57) ABSTRACT

A display device includes a display panel, an optical member, and a display driver. The display panel is configured to display a plurality of 2D images. The optical member is configured to refract 2D image display light displayed in a display area of the display panel into a first refraction direction or a second refraction direction to output 3D stereoscopic image display light. The display driver is configured to control a refraction direction of the 3D stereoscopic image display light by dividing a 3D stereoscopic image display period of at least one frame into first and second time-division frames and supplying driving voltages to the optical member in each of the first and second time-division frames.

20 Claims, 18 Drawing Sheets

290

STEREOSCOPIC IMAGE DISPLAY DEVICE

CROSS-REFERENCE TO RELATED APPLICATIONS

This application claims priority under 35 U.S.C. § 119 to Korean Patent Application No. 10-2023-0045867, filed on Apr. 7, 2023 in the Korean Intellectual Property Office, the disclosure of which is incorporated by reference herein in its entirety.

TECHNICAL FIELD

Embodiments of the present disclosure relate to a display device.

DISCUSSION OF RELATED ART

A three-dimensional (3D) image display device separately displays a left-eye image and a right-eye image to give a viewer a 3D experience using binocular parallax.

3D display technology is divided into a stereoscopic technique and an auto-stereoscopic technique. The stereoscopic technique utilizes parallax images between left and right eyes, which provide large stereoscopic effects. The stereoscopic technique may be realized with or without glasses (glasses-free 3D).

For the stereoscopic technique that utilizes glasses, a left-eye image and a right-eye image having different polarizations are displayed, so that a viewer wearing polarization glasses or shutter glasses can see 3D images. For the glasses-free stereoscopic technique, an optical member such as a parallax barrier and a lenticular lens sheet is formed in the display device, and the optical axis of a left-eye image is separated from the optical axis of a right-eye image, so that a viewer can see 3D images. The resolution of a glasses-free stereoscopic display device is determined in advance based on the number of viewing points according to parallax. As the number of image display viewing points for realizing stereoscopic images increases, the resolution decreases.

SUMMARY

Aspects of the present disclosure provide a display device that can increase the number of display viewing points of stereoscopic images by changing the refractive index of the stereoscopic images in units of time-division frames, and that can increase the resolution of the display device.

According to an embodiment of the present disclosure, a display device includes a display panel, an optical member, and a display driver. The display panel is configured to display a plurality of 2D images. The optical member is configured to refract 2D image display light displayed in a display area of the display panel into a first refraction direction or a second refraction direction to output 3D stereoscopic image display light. The display driver is configured to control a refraction direction of the 3D stereoscopic image display light by dividing a 3D stereoscopic image display period of at least one frame into first and second time-division frames and supplying driving voltages to the optical member in each of the first and second time-division frames.

In an embodiment, the optical member includes first and second polarization members and a polarization control layer. The first polarization member is configured to output the 2D image display light displayed in the display area in a first linear polarization direction. The polarization control layer is configured to output the 2D image display light in the first linear polarization direction incident through the first polarization member in the first linear polarization direction without change, or to output the 2D image display light as 3D stereoscopic image display light by converting a polarization direction of the 2D image display light into a second linear polarization direction. The second polarization member is configured to output the 2D image display light as the 3D stereoscopic image display light by converting the polarization direction of the 2D image display light in the first linear polarization direction incident through the polarization control layer into the second linear polarization direction, or to output the 3D stereoscopic image display light incident in the second linear polarization in the second linear polarization direction without change.

In an embodiment, the first polarization member includes a first base substrate, a plurality of first anisotropic lenses configured to output the 2D image display light, which is incident through the first base substrate, in the first linear polarization direction, and a first polarization electrode disposed on a front side of the first base substrate. The first polarization electrode covers an entire front surface of the first base substrate, or is formed on a front side of the plurality of first anisotropic lenses and covers all of the plurality of first anisotropic lenses which are disposed on the front surface of the first base substrate.

In an embodiment, each of the plurality of first anisotropic lenses is formed in a half-cylindrical shape and forms a light propagation path in the first linear polarization direction according to an arrangement of liquid crystals or slits included in each of the plurality of first anisotropic lenses, and outputs the 2D image display light in the first or second linear polarization direction incident through the first base substrate in the first linear polarization direction.

In an embodiment, the polarization control layer outputs the 2D image display light in the first linear polarization direction incident through the plurality of first anisotropic lenses in the first linear polarization direction without change, or converts the polarization direction of the 2D image display light into the second linear polarization direction so that the 2D image display light is refracted in the first refraction direction along the first linear polarization direction at a boundary between the plurality of first anisotropic lenses and the polarization control layer.

In an embodiment, the second polarization member includes a second base substrate, a plurality of second anisotropic lenses disposed on a rear side of the second base substrate and configured to output the 3D stereoscopic image display light incident through the polarization control layer in the second linear polarization direction, and a second polarization electrode disposed on the rear side of the second base substrate and covering an entire rear surface of the second base substrate, or formed on a rear side of each of the plurality of second anisotropic lenses and covering all of the plurality of second anisotropic lenses which are disposed on the rear surface of the second base substrate.

In an embodiment, each of the plurality of second anisotropic lenses is formed in a semi-circular concave lens shape and forms a light propagation path in the second linear polarization direction according to an arrangement of liquid crystals or slits included in each of the plurality of second anisotropic lenses, and outputs the 3D stereoscopic image display light incident through the first polarization control layer in the second linear polarization direction as the 3D stereoscopic image display light or as the 2D image display light by converting the second linear polarization direction into the first linear polarization direction.

In an embodiment, the plurality of second anisotropic lenses outputs the 3D stereoscopic image display light in the second linear polarization direction incident through the polarization control layer in the first refraction direction without change, and converts the 2D image display light in the first linear polarization direction incident through the polarization control layer into the second linear polarization direction so that the 2D image display light is refracted in the second refraction direction along the second linear polarization direction and is output as the 3D stereoscopic image display light.

In an embodiment, the display driver supplies a reference voltage of a predetermined low-level equally to the first and second polarization electrodes during the first time-division frame among the first and second time-division frames, and supplies the reference voltage to the first polarization electrode and a predetermined driving voltage to the second polarization electrode during the second time-division frame among the first and second time-division frames.

In an embodiment, the polarization control layer outputs the 2D image display light in the first linear polarization direction incident through the plurality of first anisotropic lenses in the first linear polarization direction without change by a voltage difference between the reference voltage and the predetermined driving voltage, or converts the polarization direction of the 2D image display light into the second linear polarization direction so that the 2D image display light is refracted in the first refraction direction along the first linear polarization direction at a boundary between the plurality of first anisotropic lenses and the polarization control layer.

In an embodiment, the plurality of second anisotropic lenses outputs the 3D stereoscopic image display light in the second linear polarization direction incident through the polarization control layer in the first refraction direction without change, and converts the 2D image display light in the first linear polarization direction incident through the polarization control layer into the second linear polarization direction so that the 2D image display light is refracted in the second refraction direction along the second linear polarization direction and is output as the 3D stereoscopic image display light.

In an embodiment, each of the first anisotropic lenses is convex and each of the second anisotropic lenses is concave, a width and a length of each of the plurality of first anisotropic lenses are equal to a width and a length of each of the plurality of second anisotropic lenses, and a maximum height of each of the first anisotropic lenses is equal to or greater than a maximum depth of each of the second anisotropic lenses.

In an embodiment, the plurality of first anisotropic lenses and the plurality of second anisotropic lenses face each other and are shifted by about ½ spacing in either direction of an x-axis direction or a y-axis direction, and are arranged such that lowest portions of the plurality of second anisotropic lenses are in line with highest portions of the first anisotropic lenses.

In an embodiment, a distance between the plurality of first anisotropic lenses and the plurality of second anisotropic lenses facing each other is equal to or greater than the maximum height of each of the first anisotropic lenses.

According to an embodiment of the present disclosure, a display device includes an optical member. The optical member is configured to refract 2D image display light displayed in a display area of a display panel in a first refraction direction or a second refraction direction. The optical member includes a first polarization member configured to output the 2D image display light displayed in the display area in a first linear polarization direction, a polarization control layer configured to output the 2D image display light in the first linear polarization direction incident through the first polarization member in the first linear polarization direction without change, or to output the 2D image display light as 3D stereoscopic image display light by converting a polarization direction of the 2D image display light into a second linear polarization direction, and a second polarization member configured to output the 2D image display light as the 3D stereoscopic image display light by converting the polarization direction of the 2D image display light in the first linear polarization direction incident through the polarization control layer into the second linear polarization direction, or to output the 3D stereoscopic image display light incident in the second linear polarization in the second linear polarization direction without change.

In an embodiment, the display device further includes a display driver configured to control a refraction direction of the 3D stereoscopic image display light by dividing a 3D stereoscopic image display period of at least one frame into first and second time-division frames and supplying a driving voltage to the second polarization member for each of the first and second time-division frames.

In an embodiment, the first polarization member includes a first base substrate, a plurality of first anisotropic lenses configured to output the 2D image display light, which is incident through the first base substrate, in the first linear polarization direction, and a first polarization electrode disposed on a front side of the first base substrate. The first polarization electrode covers an entire front surface of the first base substrate, or is formed in a front side of the plurality of first anisotropic lenses and covers all of the plurality of first anisotropic lenses which are disposed on the front surface of the first base substrate.

In an embodiment, the second polarization member includes a second base substrate, a plurality of second anisotropic lenses disposed on a rear side of the second base substrate and configured to convert a polarization direction of the 2D image display light or the 3D stereoscopic image display light incident through the polarization control layer into the second linear polarization direction and output the 2D image display light or the 3D stereoscopic image display light, and a second polarization electrode disposed on the rear side of the second base substrate and covering an entire rear surface of the second base substrate, or formed on a rear side of each of the plurality of second anisotropic lenses and covering all of the plurality of second anisotropic lenses which are disposed on the rear surface of the second base substrate.

In an embodiment, the polarization control layer outputs the 2D image display light in the first linear polarization direction incident through the plurality of first anisotropic lenses in the first linear polarization direction without change by a voltage difference between a reference voltage and the driving voltage, or converts the polarization direction of the 2D image display light into the second linear polarization direction so that the 2D image display light is refracted in the first refraction direction along the first linear polarization direction at a boundary between the plurality of first anisotropic lenses and the polarization control layer and is output as the 3D stereoscopic image display light.

In an embodiment, the plurality of second anisotropic lenses outputs the 3D stereoscopic image display light in the second linear polarization direction incident through the polarization control layer in the first refraction direction without change, and converts the 2D image display light in the first linear polarization direction incident through the polarization control layer into the second linear polarization direction so that the 2D image display light is refracted in the second refraction direction along the second linear polarization direction and is output as the 3D stereoscopic image display light.

According to embodiments of the present disclosure, it is possible to increase the number of display viewing points of stereoscopic images displayed in a display panel of a display device in units of predetermined time-division frames by changing the refractive index of the stereoscopic images in units of the time-division frames.

In addition, it is possible to further improve the display quality of stereoscopic images by increasing the resolution of the stereoscopic display images to correspond to the rate of increase in the number of display viewing points of the stereoscopic images.

It should be noted that effects of an embodiments are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the accompanying drawings.

DETAILED DESCRIPTION OF AN EMBODIMENTS

Figure 1:
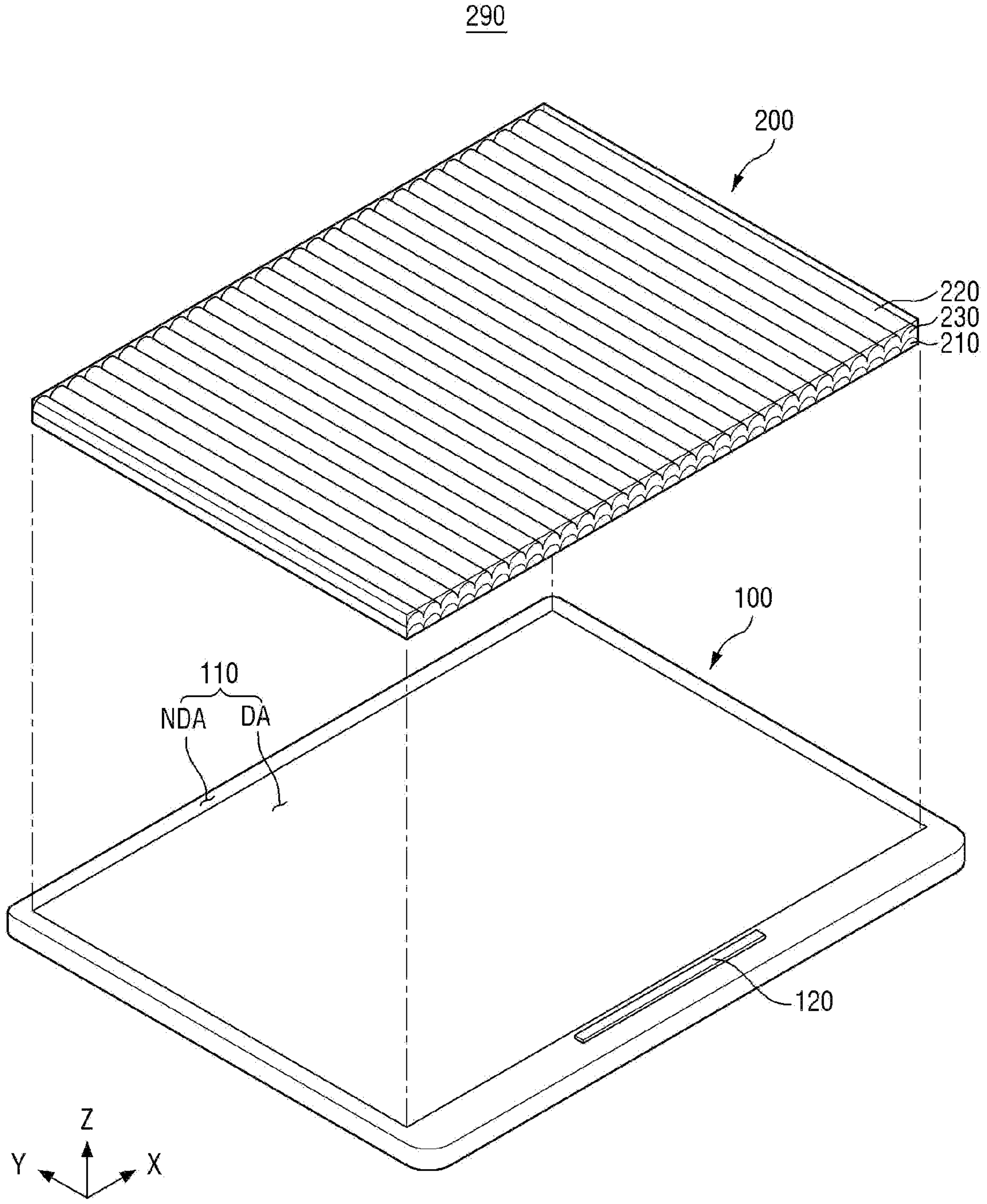
FIG. 1 is an exploded perspective view showing a display device according to an embodiment.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Figure 2:
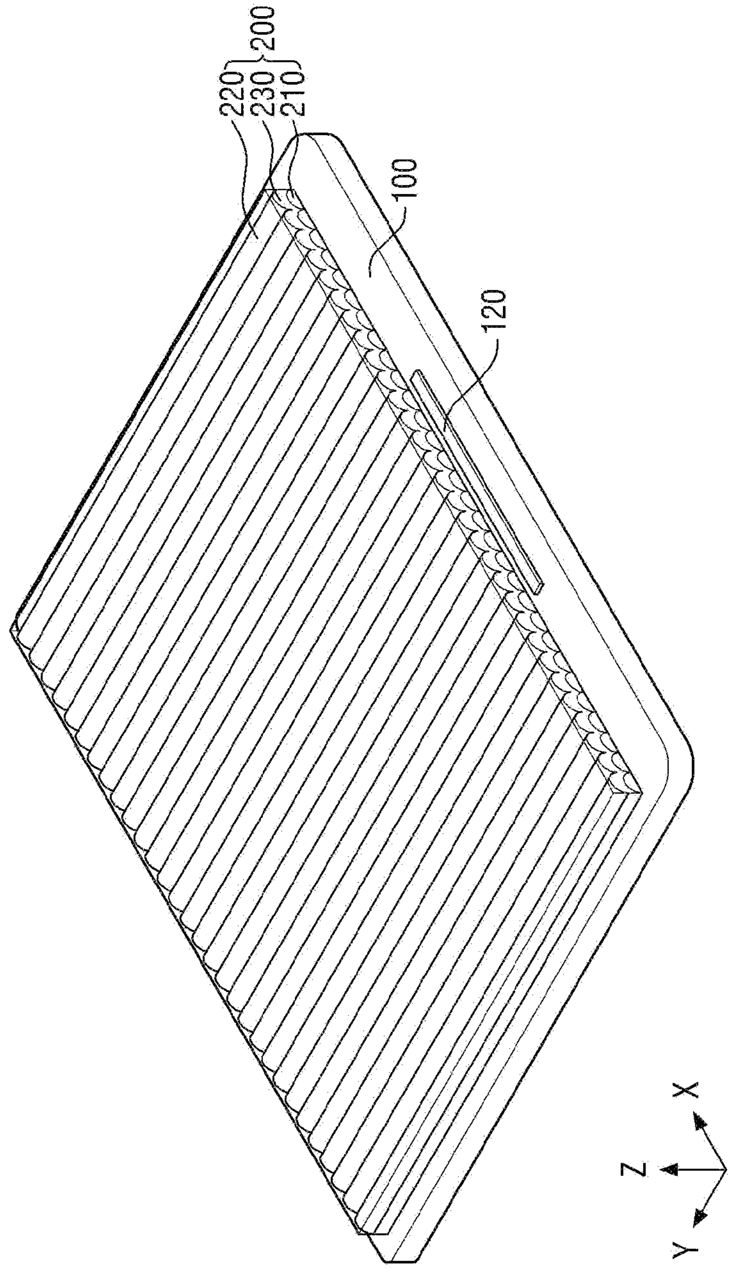
FIG. 2 is a view showing the display panel and an optical member shown in FIG. 1 attached together according to an embodiment.

FIG. 1 is an exploded perspective view showing a display device according to an embodiment of the present disclosure. FIG. 2 is a view showing the display panel and an optical member shown in FIG. 1 when attached together according to an embodiment of the present disclosure.

A display device 290 may be implemented as a flat panel display device such as, for example, a liquid-crystal display (LCD) device, a field emission display (FED) device, a plasma display panel (PDP) device, and an organic light-emitting display (OLED) device.

The display device 290 may be a stereoscopic image display device including a display module 100 and an optical member 200, e.g., a 3D image display device. To display 3D images, the 3D image display device separately displays a left-eye image and a right-eye image on the front side to provider a viewer with a 3D experience utilizing binocular parallax. Furthermore, the 3D image display device may separately provide images at different viewing angles on the front side of the display device so that different images are displayed at the different viewing angles.

According to an embodiment of the present disclosure, the display device 290 may be a light-field display device that allows different image information to be seen by a viewers' eyes, respectively, by disposing the optical member 200 on the front side of the display module 100. The light-field display device may generate a 3D image by generating a light field with the display module 100 and the 3D optical member 200. As will be described further below, light rays generated in each of the pixels of the display module 100 of the light-field display device form a light field directed to a particular direction (a particular viewing angle and/or a particular viewpoint) by, for example, stereoscopic lenses, pinholes or barriers. In this manner, 3D image information associated with the particular direction can be provided to the viewer.

Figure 17:
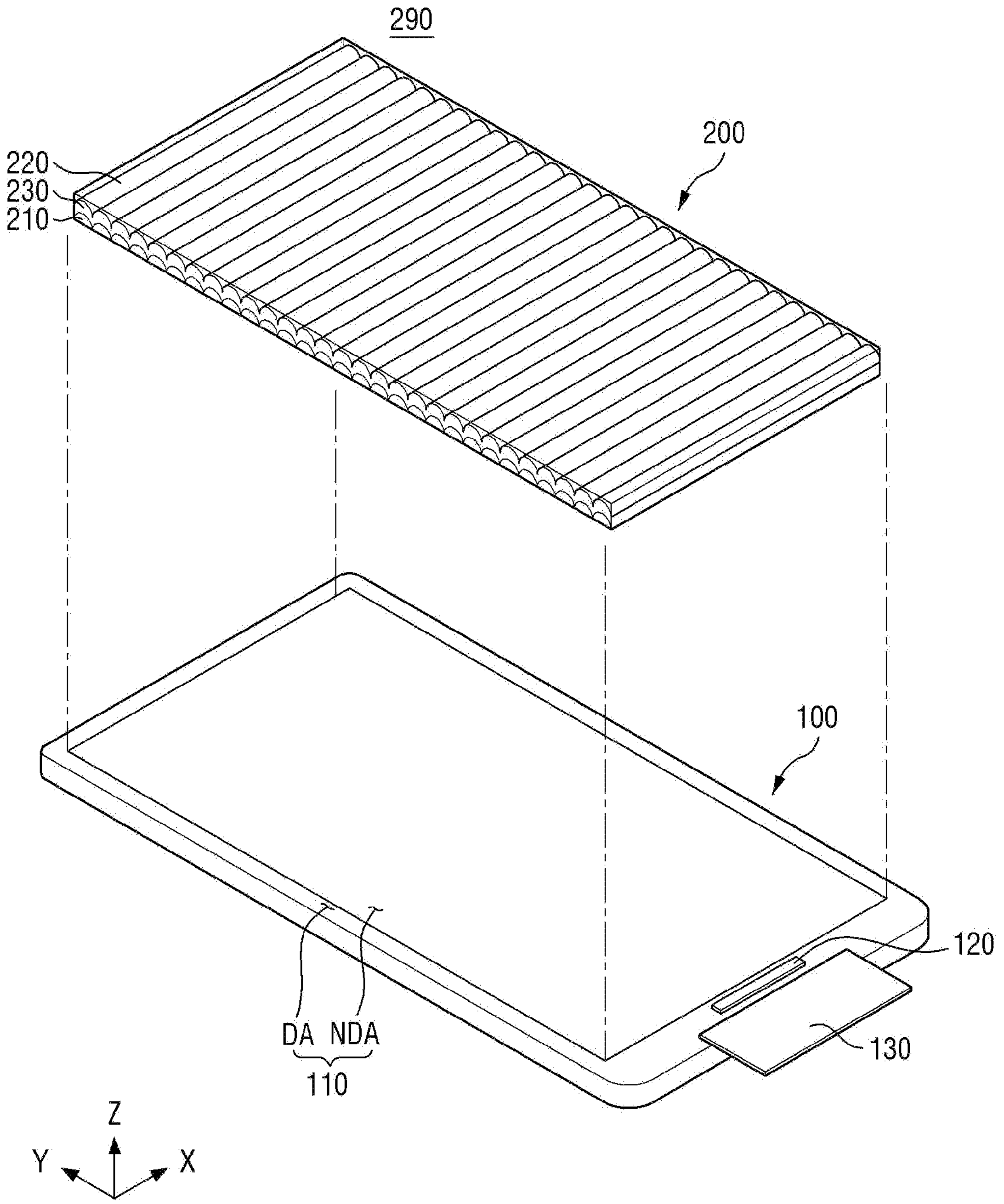
FIG. 17 is an exploded perspective view showing a display device according to an embodiment.

The display module 100 may include a display panel 110, a display driver 120, and a circuit board 130 (see FIG. 17).

The display panel 110 may include a display area DA and a non-display areas NDA. The display area DA may include data lines, scan lines, supply voltage lines, and a plurality of pixels connected to the data lines and scan lines. For example, the scan lines may be extended in the first direction (x-axis direction) and be spaced apart from one another in the second direction (y-axis direction). The data lines and the supply voltage lines may be extended in the second direction (y-axis direction) and be spaced from one another in the first direction (x-axis direction).

Each of the pixels may be connected to at least one scan line, data line, and supply voltage line. Each of the pixels may include, for example, thin-film transistors including a driving transistor and at least one switching transistor, a light-emitting element, and a capacitor. When a scan signal is applied from a scan line, each of the pixels receives a data voltage from a data line and supplies a driving current to the light-emitting element according to the data voltage applied to the gate electrode, so that light can be emitted.

Herein, the pixels of the display panel 110 display 2D multi-view images according to the order in which the display driver 120 provides image data. The multi-view images include n view images, where n is a positive integer equal to or greater than two. Such n view images are generated by capturing images of an object with n cameras spaced apart from one another by the distance between a person's eyes. The display panel 110 displays multi-view images in units of n pixels during an image display period. For example, the display panel 110 may display multi-view images in units of two pixels. In other words, two pixels of the display panel 110 may display a multi-view image including two view images. For example, the display panel 110 may display a multi-view image in units of time-division frames (or sub-frames) according to the time-division driving of the display driver 120. Multi-view images may be displayed in units of two pixels for each time-division frame. A time-division frame is a period that divides one frame into ½ or ⅓ sub-frames.

The non-display area NDA may be disposed at the edge of the display panel 110 and may surround the display area DA. The non-display area NDA may include a scan driver that applies scan signals to scan lines, and pads connected to the display driver 120. For example, the display driver 120 may be disposed on one side of the non-display area NDA, and the pads may be disposed on one edge of the non-display area NDA on which the display driver 120 is disposed.

The display driver 120 may output control signals and image data voltages that drive the display panel 110 in units of at least one frame or at least one time-division frame (or sub-frame). For example, the display driver 120 may supply image data voltages to the data lines in units of at least one time-division frame (or sub-frame). The display driver 120 supplies a supply voltage to the supply voltage line, and may supply scan control signals to the scan driver.

The display driver 120 designates a viewing point and a viewing point number according to the viewing point for each sub-pixel depending on the relative positions of the sub-pixels for each of the plurality of anisotropic lenses (e.g., refractive-index anisotropic lenses) included in each of the first and second polarization members 210 and 220 of the optical member 200. In addition, the display driver 120 aligns positions of image data input from an external source for each horizontal line based on the viewing points and the viewing point numbers of the sub-pixels. The display driver 120 may generate image data voltages corresponding to the image data aligned whose arrangement positions are aligned for each horizontal line and supply the image data voltages to the data lines. As a result, images may be displayed according to the relative arrangement positions of the sub-pixels with respect to the first and second polarization members 210 and 220.

The display driver 120 may be implemented as an integrated circuit (IC) and may be disposed in the non-display area NDA of the display panel 110 by, for example, a chip on glass (COG) technique, a chip on plastic (COP) technique, or an ultrasonic bonding. In an embodiment, the display driver 120 may be mounted on a circuit board and connected to the pads of the display panel 110.

The optical member 200 may be disposed on the front side of the display panel 110 or the display module 100. The optical member 200 may be attached to one surface of the display panel 110 or the display area DA through an adhesive member. The optical member 200 may be attached to the front surface of the display module 100 by a panel bonding apparatus.

The optical member 200 may be implemented as a lenticular lens sheet including first and second polarization members 210 and 220 and a polarization control layer 230 disposed between the first and second polarization members 210 and 220. For example, the first polarization member 210 may include a plurality of first anisotropic lenses (or a first anisotropic lens sheet) forming a path in a first linear polarization direction according to the arrangement of liquid crystals or slits included therein. On the other hand, the second polarization member 220 may include a plurality of second anisotropic lenses (or a second anisotropic lens sheet) forming a path in a second linear polarization direction according to the arrangement of liquid crystals or slits included therein. The polarization control layer 230 may be formed between the first and second polarization members 210 and 220. The polarization control layer 230 maintains the 2D image display light in the first linear polarization direction incident through the first polarization member 210 without change along the path in the first linear polarization direction, or converts the path in the first linear polarization direction into a path in the second linear polarization direction to permit the 2D image display light to exit as 3D stereoscopic image display light under the control of the display driver 120.

When the polarization control layer 230 controls the first linear polarization direction to convert into the second linear polarization direction, 2D image display light passing through the first polarization member 210 may be refracted into 3D stereoscopic image display light on the surfaces of the plurality of first anisotropic lenses. Alternatively, when the polarization control layer 230 maintains the path in the first linear polarization direction, the 2D image display light passing through the first polarization member 210 and the polarization control layer 230 may be refracted into 3D stereoscopic image display light by a plurality of second anisotropic lenses included in the second polarization member 220. The first and second anisotropic lenses may be, for example, refractive index anisotropic lenses including a birefringent material such as liquid crystals.

Figure 3:
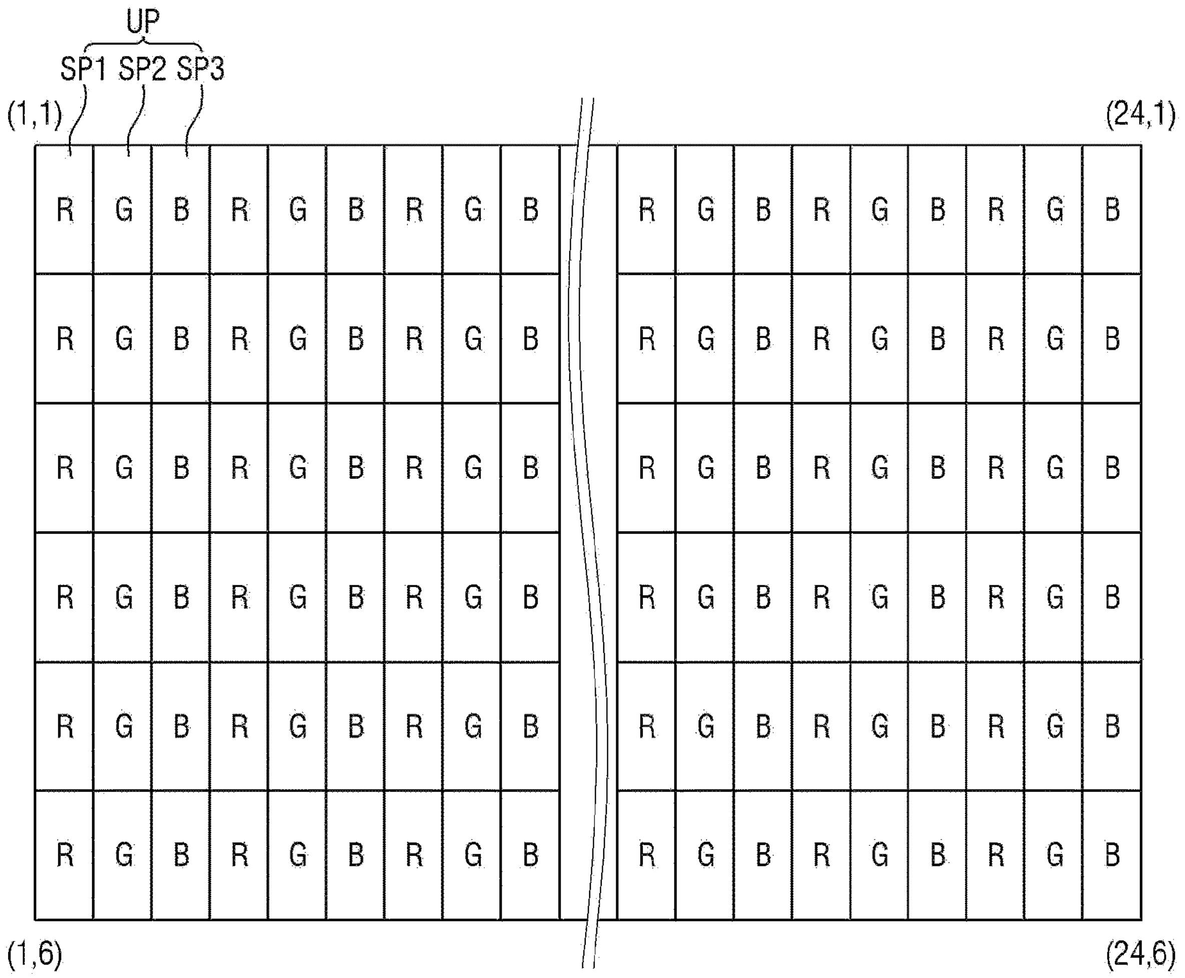
FIG. 3 is a plan view showing a part of an arrangement structure of sub-pixels in a display area according to an embodiment.

FIG. 3 is a plan view showing a part of an arrangement structure of sub-pixels in a display area according to an embodiment.

FIG. 3 shows the arrangement structure of sub-pixels arranged in six rows and twenty-four columns. Accordingly, the arrangement structure in FIG. 3 includes a sub-pixel located at a first row and a first column to a sub-pixel located at a sixth row and a twenty-fourth column.

Referring to FIG. 3, a plurality of unit pixels UP is disposed and formed in the display area DA of the display panel 110, and each of the unit pixels UP includes a plurality of sub-pixels SP1, SP2 and SP3. The sub-pixels SP1, SP2 and SP3 may be arranged in a plurality of rows and a plurality of columns. For example, the sub-pixels SP1, SP2 and SP3 may be arranged and formed in a vertical or horizontal stripe structure. The display area DA may include more unit pixels UP as the resolution of the display device 290 increases.

For example, each of the unit pixels UP may include first to third sub-pixels SP1 SP2 and SP3 that display different colors. The first to third sub-pixels SP1 SP2 and SP3 may be formed as n data lines and m scan lines intersect each other, where n and m are positive integers. Each of the plurality of sub-pixels SP1 SP2 and SP3 may include a light-emitting element and a pixel circuit. The pixel circuit may include, for example, a driving transistor, at least one switching transistor and at least one capacitor that drive the light-emitting element of each of the plurality of sub-pixels.

Each of the plurality of unit pixels UP may include one first sub-pixel SP1, one second sub-pixel SP2, and one third sub-pixel SP3. Alternatively, each of the plurality of unit pixels UP may include four sub-pixels, e.g., one first sub-pixel SP1, two second sub-pixels SP2, and one third sub-pixel SP3. The number of sub-pixels included in each unit pixel UP is not necessarily limited thereto. The first sub-pixel SP1 may be a red sub-pixel, the second sub-pixel SP2 may be a green sub-pixel, and the third sub-pixel SP3 may be a blue sub-pixel. Each of the first to third sub-pixels SP1, SP2 and SP3 may receive a data signal including luminance information of red, green or blue light from the display driver 120 and may output light of the respective color.

Figure 4:
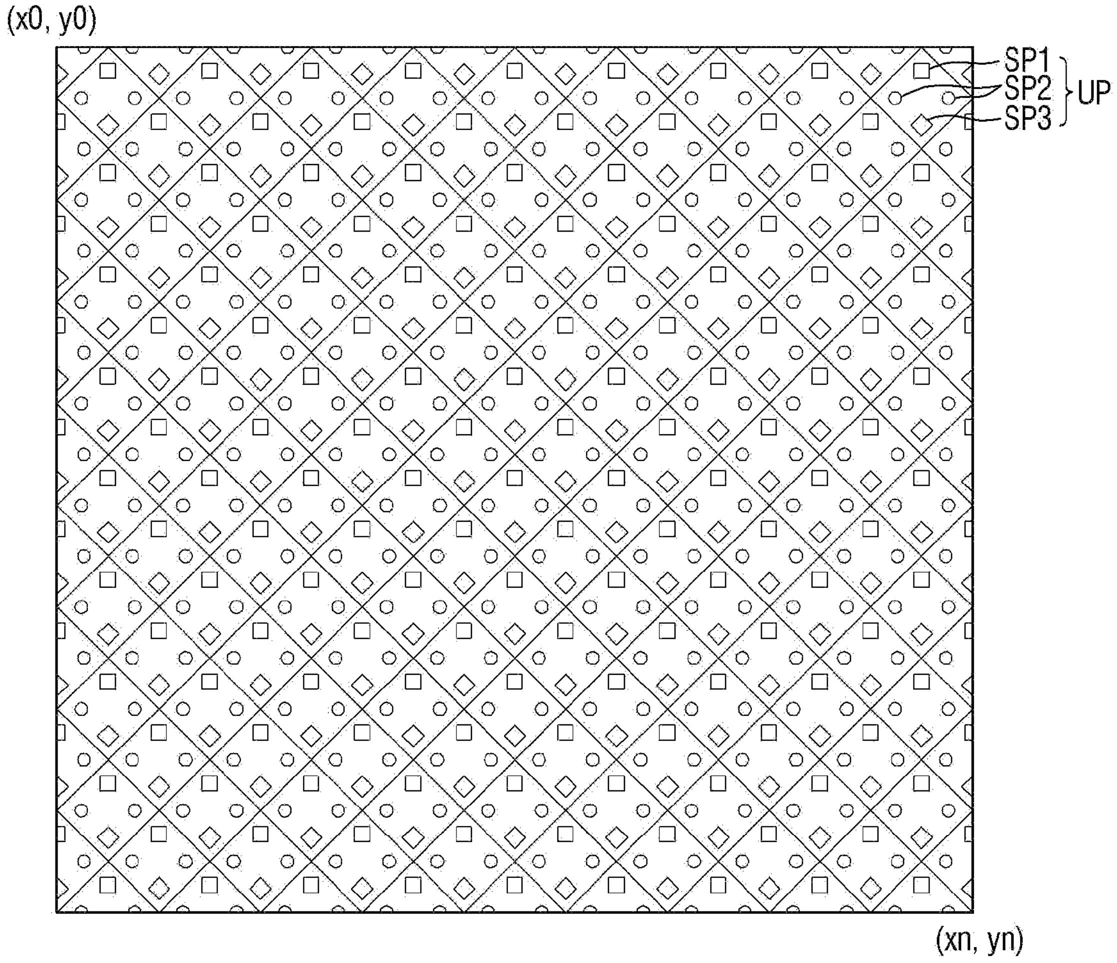
FIG. 4 is a plan view showing a part of an arrangement structure of sub-pixels of a display area according to an embodiment.

FIG. 4 is a plan view showing a part of an arrangement structure of sub-pixels of a display area according to an embodiment.

Referring to FIG. 4, a plurality of unit pixels UP and a plurality of sub-pixels SP1, SP2 and SP3 may be arranged in a Pentile™ matrix. For example, each of the plurality of unit pixels UP may include first to third sub-pixels SP1, SP2 and SP3 arranged in the Pentile™ matrix. The first to third sub-pixels SP1 SP2 and SP3 may be formed as n data lines and m scan lines intersecting each other, where n and m are positive integers which may be different from or equal to each other.

Each of the plurality of unit pixels UP may include, but is not limited to, one first sub-pixel SP1, two second sub-pixels SP2, and one third sub-pixel SP3. The first sub-pixel SP1 may be a red sub-pixel, the second sub-pixel SP2 may be a green sub-pixel, and the third sub-pixel SP3 may be a blue sub-pixel. The size of the opening of each of the first to third sub-pixels SP1, SP2 and SP3 may be determined depending on the luminance of the light. Accordingly, the size of the opening of each of the first to third sub-pixels SP1, SP2 and SP3 may be adjusted to represent white light by mixing lights emitted from a plurality of emissive layers. Each of the first to third sub-pixels SP1 SP2 and SP3 may receive a data signal including luminance information of red, green or blue light from the display driver 120, and may output light of the respective color.

Figure 5:
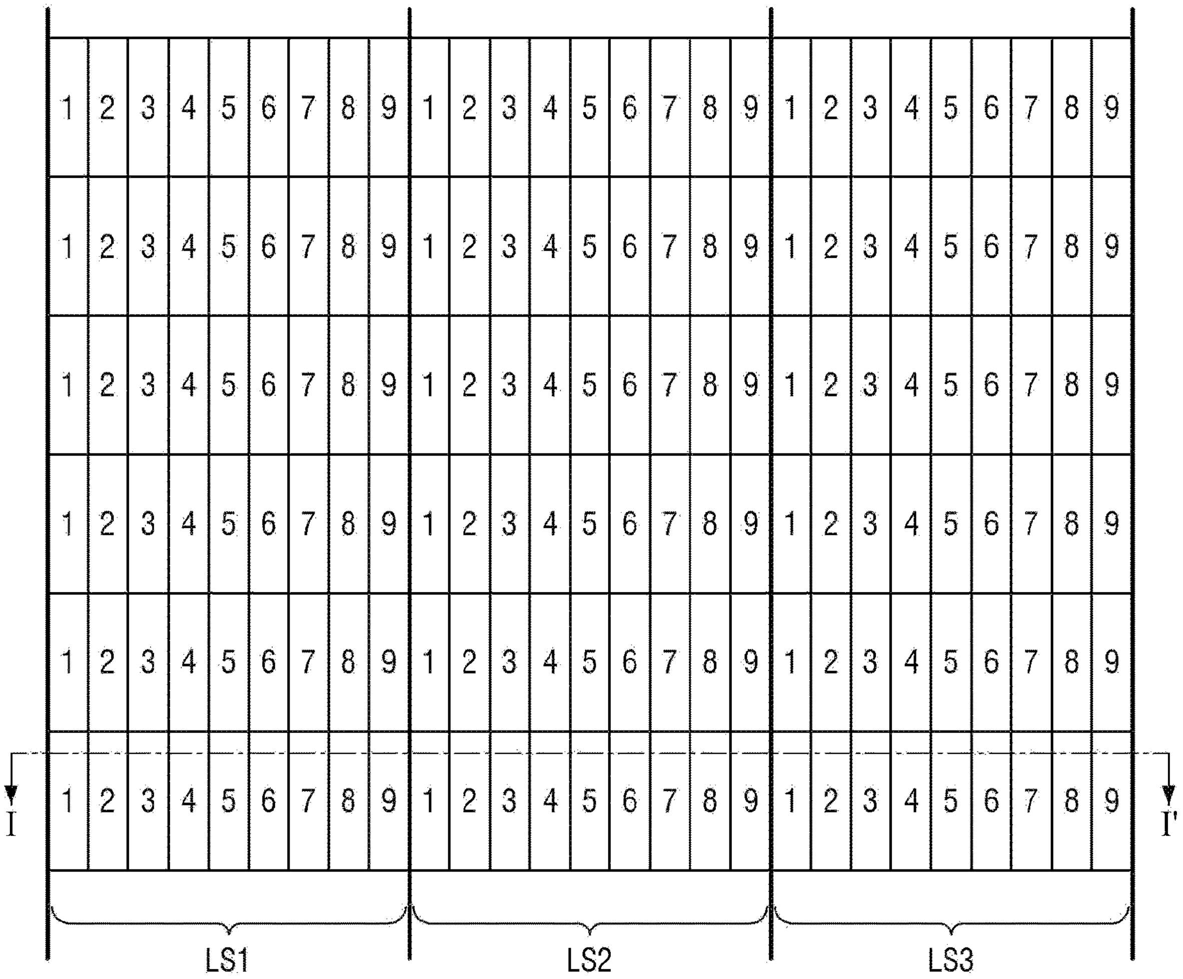
FIG. 5 is a view showing a method of setting viewpoint information for each sub-pixel according to the lens width of an optical member according to an embodiment.

FIG. 5 is a view showing a method of setting viewpoint information for each sub-pixel according to the lens width of an optical member according to an embodiment.

Referring to FIG. 5, viewing point information and viewing point number for each sub-pixel are set by the width and slanted angle of each of the first anisotropic lenses LS1, LS2 and LS3 included in the first polarization member 210. For example, the relative positions of the sub-pixels SP1, SP2 and SP3 overlapping with the first anisotropic lenses LS1, LS2 and LS3 may be designated in order depending on the width and slanted angle of each of the first anisotropic lenses LS1, LS2, and LS3.

For example, the viewing point information and viewing point number according to the relative positions of the sub-pixels SP1, SP2 and SP3 overlapping the first anisotropic lenses LS1, LS2 and LS3 may be designated repeatedly in the width direction of the first anisotropic lenses LS1, LS2 and LS3 or in the x-axis direction. This may be expressed in Equation 1 below:

$$\text{Viewing Point Information(or Viewing Points Number)} = \text{rows} \times \text{pixelsize} \times \tan(\text{slanted angle}) \quad \text{[Equation 1]}$$

where rows denote the number in the horizontal line direction, and pixel size denotes the width or size of each sub-pixel. In addition, tan (slanted angle) denotes the slanted angle tθ. According to an embodiment, the lenses are arranged in parallel in the y-axis direction (or vertical direction), and thus tan (slanted angle) is equal to 1.

The viewpoint information (or viewpoint numbers) of the sub-pixels arranged in the first horizontal line and the viewpoint information from the second horizontal line to the last horizontal line are the same in the y-axis direction (or vertical direction).

For example, the viewing point information for each of the sub-pixels SP1, SP2 and SP3 is designated based on the relative positions of the sub-pixels SP1, SP2 and SP3 of each of the first anisotropic lenses LS1, LS2 and LS3, and image display points or viewing points of the display device 290 are designated based on the viewing point information and number of each of the sub-pixels SP1, SP2 and SP3.

As shown in FIG. 5, the image display points or viewing points of the display device 290 may be in line with or lie within the width of each of the first anisotropic lenses LS1, LS2 and LS3, and may be set in the same manner as the number and the viewing point numbers of the sub-pixels disposed on the rear surface of each of the first anisotropic lenses LS1, LS2 and LS3. For example, the viewpoints may be in line with or lie within the width of the rear surface (or base surface or base side) of each of the first anisotropic lenses LS2, LS2 and LS3. If the number of the sub-pixels disposed on the rear surface of each of the first anisotropic lenses LS1, LS2 and LS3 is nine, there may be nine viewpoints for detecting optical properties of the display device 290.

Figure 6:
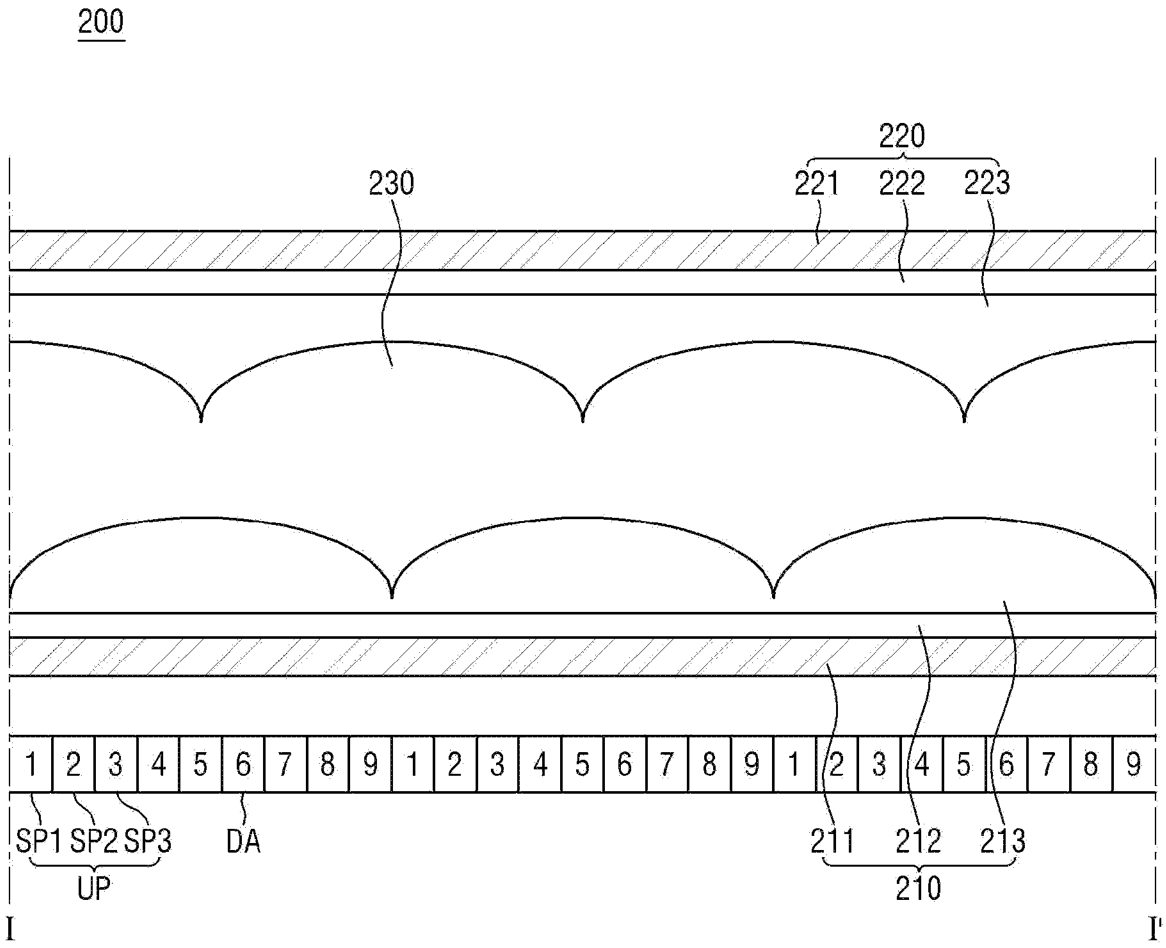
FIG. 6 is a cross-sectional view showing the sub-pixels and the optical member according to an embodiment, taken along line I-I' shown in FIG. 5.

FIG. 6 is a cross-sectional view according to an embodiment, taken along line I-I' shown in FIG. 5.

Referring to FIGS. 5 and 6, the display device 290 includes the display panel 110 that displays 3D stereoscopic images, and the optical member 200 that refracts display lights of the stereoscopic images displayed in the display area DA of the display panel 110 in a first refraction direction or a second refraction direction to output the display lights.

As described above, the first to third sub-pixels SP1, SP2 and SP3 sequentially arranged in the display area DA of the display panel 110 display multi-view images. For example, during a 3D stereoscopic image display period, the first to third sub-pixels SP1, SP2 and SP3 may display 2D multi-view images in units of at least two adjacent sub-pixels. That is to say, at least every two adjacent sub-pixels may display multi-view images including two view images. At this time, the first to third sub-pixels SP1, SP2 and SP3 of the display panel 110 may emit 2D image display lights in the first linear polarization direction to the front side according to the orientations of a polarizer or a polarizing sheet on the front side.

The optical member 200 may refract the display lights of 2D images displayed in the display area DA of the display panel 110 into the first refraction direction along the first linear polarization direction to output the display lights, or may refract the display lights into the second refraction direction along the second linear polarization direction to output the display lights.

For example, in a first time-division frame of one frame, the optical member 200 refracts display lights of 2D images displayed in the display area DA into the first refraction direction along the first linear polarization direction to output the display lights on the front side of the optical member 200. Accordingly, in the first time-division frame, stereoscopic image display light of each sub-pixel is output for each viewing point along the first refraction direction. In addition, in a second time-division frame of one frame, the optical member 200 refracts display lights of stereoscopic images displayed in the display area DA into the second refraction direction along the second linear polarization direction to output the display lights on the front side of the optical member 200. Accordingly, in the second time-division frame, 3D stereoscopic image display light of each sub-pixel is output for each viewing point along the second refraction direction. In this manner, 3D stereoscopic images for different viewing points are output according to the first and second refraction directions varying in units of the first and second time-division frames, so that images for different viewing points are generated during the first and second time-division frames. Accordingly, images for different viewing points are displayed during the first and second time-division frames, which are one frame. Accordingly, it is possible to achieve the effect that the image display resolution can be doubled in units of at least one frame according to embodiments of the present disclosure.

As shown in FIG. 6, the optical member 200 includes the first polarization member 210, the polarization control layer 230 and the second polarization member 220.

The first polarization member 210 is disposed in the front surface of the display area DA and outputs 2D image display lights displayed in the display area DA on the rear side in the first linear polarization direction. For example, the first linear polarization direction may refer to the direction of light traveling while oscillating in the z-axis direction, and the second linear polarization direction may refer to the direction of light traveling while oscillating in the x-axis direction.

The first polarization member 210 includes a first base substrate 211, at least one first polarization electrode 212, and a plurality of first anisotropic lenses (or a first anisotropic lens sheet) 213.

The first base substrate 211 is disposed on the front surface of the display area DA in the shape of a flat plate. One surface of the first base substrate 211 and the opposite surface of the first base substrate 211 may be parallel to each other. The first base substrate 211 may transmit light incident from the display area DA without change to output the light. In other words, the linear polarization direction of the 2D image display light passing through the rear surface of the first base substrate 211 is maintained in the same linear polarization direction while light is transmitted from the front surface of the first base substrate 211.

The first polarization electrode 212 may be formed on the front surface of the first base substrate 211 so that it completely covers the front surface of the first base substrate 211. Alternatively, the first polarization electrode 212 may be formed on the front side of the first anisotropic lenses 213 to cover all of the first anisotropic lenses 213 disposed on the first base substrate 211. Referring to FIG. 6 and the like, an example in which the first polarization electrode 212 covers the entire front surface of the first base substrate 211 and is disposed on the rear surface of the plurality of first anisotropic lenses 213 will be described.

Under the control of the display driver 120, a reference voltage of a low level may be applied to the first polarization electrode 212 from a power supply. Herein, the reference voltage may range from about −5 V to about 10 V.

A plurality of first anisotropic lenses (or a first anisotropic lens sheet) 213 is disposed on the front side of the first base substrate 211 or the first polarization electrode 212, and outputs stereoscopic image display lights incident through the first base substrate 211 in the first linear polarization direction.

The first anisotropic lenses 213 form light propagation paths in the first linear polarization direction according to the arrangement of liquid crystals or slits included therein. For example, the plurality of first anisotropic lenses 213 may be formed by aligning the tilt or the direction of the longer axes of liquid crystals, or the direction of arrangement and tilt of the slits in the first linear polarization direction, and then curing the first anisotropic lenses 213. Each of the first anisotropic lenses 213 may be formed in a half-cylindrical shape.

For example, the plurality of first anisotropic lenses 213 may be slanted lenses inclined by a predetermined angle from the side of each of the plurality of sub-pixels in the display area DA or half-cylindrical lenses. The predetermined angle may be designed to prevent the color lines of the display device 290 from being perceived by a viewer. In an embodiment, the first anisotropic lenses 213 may be implemented as Fresnel lenses. The shape or type of each of the first anisotropic lenses 213 is not necessarily limited thereto.

When stereoscopic image display light is incident on the rear surface of the plurality of first anisotropic lenses 213 in the first linear polarization direction, the stereoscopic image display light incident in the first linear polarization direction passes without change (e.g., as it is) in that direction according to the refractive index in the shorter axis direction of the liquid crystals included in the plurality of first anisotropic lenses 213.

When the polarization control layer 230 disposed on the front surface of the plurality of first anisotropic lenses 213 also forms a light exit direction in the first linear polarization direction, which is the shorter axis direction of liquid crystals, the stereoscopic image display light passing through the first anisotropic lenses 213 passes through the polarization control layer 230 without being refracted on the surface of the first anisotropic lenses 213.

If the polarization control layer 230 disposed on the front surface of the plurality of first anisotropic lenses 213 forms a light exit direction in the second linear polarization direction, which is the longer axis direction of the liquid crystals, the stereoscopic image display light passing through the first anisotropic lenses 213 is refracted in the first refraction direction on the surface of the first anisotropic lenses 213 that is the boundary with the polarization control layer 230. The stereoscopic image display light exiting in the first linear polarization direction from the plurality of first anisotropic lenses 213 is refracted in the first refraction direction from the surface of the first anisotropic lens 213, such that the polarization direction is converted into the second linear polarization direction by the polarization control layer 230. Accordingly, stereoscopic image display light of each sub-pixel is output for each viewing point according to the first refraction direction.

The second polarization member 220 is disposed parallel to the first polarization member 210 in the horizontal direction such that the second polarization member 220 faces the first polarization member 210 with the polarization control layer 230 disposed therebetween.

When stereoscopic image display light in the second linear polarization direction is incident in the first refraction direction through the polarization control layer 230, the second polarization member 220 outputs the stereoscopic image display light in the second linear polarization direction without change (e.g., as it is). Alternatively, when 2D image display light in the first linear polarization direction is incident through the polarization control layer 230, the second polarization member 220 converts paths of the 2D image display light in the first linear polarization direction into paths in the second linear polarization direction. At this time, the stereoscopic image display light is refracted into the second refraction direction by the second polarization member 220, and 3D stereoscopic image display light of each sub-pixel may be exit from the incident surface of the second polarization member 220 for each viewing point along the second refraction direction.

The second polarization member 220 includes a second base substrate 221, at least one second polarization electrode 222, and a plurality of second anisotropic lenses (or a second anisotropic lens sheet) 223.

The second base substrate 221 is disposed on the front side of the polarization control layer 230 in the shape of a flat plate. One surface of the second base substrate 221 and the opposite surface of the second base substrate 221 may be parallel to each other. The second base substrate 221 may be formed of, for example, transparent glass or a transparent plastic film so that the linear polarization direction of stereoscopic image display light passing through the rear surface is maintained and passes through the front surface.

The second polarization electrode 222 may be formed on the rear side of the second base substrate 221 and may cover the entire rear surface of the second base substrate 221. Alternatively, the second polarization electrode 222 may be disposed on the rear side of the second anisotropic lenses 223 and may cover the entire light incident surface of the second anisotropic lenses 223 disposed on the rear surface of the second base substrate 221. In the example shown in FIG. 6 and the like, the second polarization electrode 222 is formed on the rear side of the second base substrate 221 and covers the entire incident surface of the second base substrate 221.

Under the control of the display driver 120, a reference voltage of a low-level voltage may be applied to the second polarization electrode 222 from the power supply, or a first driving voltage of a high-level voltage may be applied to the second polarization electrode 222. The reference voltage may range from about −5 V to about 10 V, and the first driving voltage may range from about 15 V to about 30 V greater than the reference voltage. In addition, a second driving voltage higher than the first driving voltage may be applied from the power supply to the second polarization electrode 222 under the control of the display driver 120. For example, the second driving voltage may be greater than or equal to about 31 V higher than the first driving voltage. Accordingly, the first or second linear polarization direction of the polarization control layer 230 may be changed by the voltage difference between the reference voltage applied to the first polarization electrode 212 of the first polarization member 210 and the first or second driving voltage applied to the second polarization electrode 222 of the second polarization member 220. On the other hand, the first linear polarization direction may be maintained by the voltage difference between the reference voltage applied to the first polarization electrode 212 of the first polarization member 210 and the reference voltage applied to the second polarization electrode 222 of the second polarization member 220.

The plurality of second anisotropic lenses (or a second anisotropic lens sheet) 223 is disposed on the rear side of the second base substrate 221 or the second polarization electrode 222, and outputs stereoscopic image display light incident through the polarization control layer 230 in the second linear polarization direction.

The second anisotropic lenses 223 form light propagation paths in the second linear polarization direction according to the arrangement of liquid crystals or slits included therein. For example, the plurality of second anisotropic lenses 223 may be formed by aligning the direction of the longer axes of liquid crystals, or the direction of arrangement of the slits in the second linear polarization direction and then curing the second anisotropic lenses 223. The second anisotropic lenses 223 may be formed as plurality of concave lenses.

The plurality of second anisotropic lenses 223 may also be slanted lenses inclined by a predetermined angle from the side of each of the plurality of sub-pixels in the display area DA or concave lenses. The second anisotropic lenses 223 may be implemented as Fresnel lenses. The shape or type of each of the second anisotropic lenses 223 is not necessarily limited thereto.

When stereoscopic image display light is incident on the rear surface of the second anisotropic lenses 223 in the second linear polarization direction, the stereoscopic image display light incident in the second linear polarization direction passes without change (e.g., as it is) in that direction according to the refractive index in the shorter axis direction of the liquid crystals included in the second anisotropic lenses 223. As a result, the light exit direction of the stereoscopic image display light output in the first refraction direction is also maintained.

On the other hand, when the polarization control layer 230 forms a light exit direction in the first linear polarization direction, which is the direction of the shorter axis of the liquid crystals, and the image display light is incident on the rear surface of the second anisotropic lenses 223 in the first linear polarization direction, the image display light is refracted in the second refraction direction by the plurality of second anisotropic lenses 223. That is to say, by forming paths in the first linear polarization direction, the image display light incident on the rear surface of the second anisotropic lenses 223 is converted into the second linear polarization direction according to the refractive index of the liquid crystals included in the second anisotropic lenses 223 in the shorter axis direction. At this time, the image display light is refracted in the second refraction direction from the surface of the second anisotropic lenses 223, which is the boundary between the polarization control layer 230 and the second anisotropic lenses 223. Accordingly, 3D stereoscopic image display light of each sub-pixel is output for each viewing point along the second refraction direction from the second anisotropic lenses 223.

The polarization control layer 230 is formed between the first polarization member 210 and the second polarization member 220 to transmit image display light in the first linear polarization direction incident through the first polarization member 210 without change (e.g., as it is) in that direction or convert the first polarization direction into the second linear polarization direction, to output the image display light.

The polarization control layer 230 is interposed between the first polarization electrode 212 and the second polarization electrode 222, transmits the polarization direction of the image display light in the first linear polarization direction, and converts the polarization direction of the image display light into the second linear polarization direction depending on the voltage difference between the first polarization electrode 212 and the second polarization electrode 222, which face each other. To this end, the polarization control layer 230 may include a liquid-crystal layer in which liquid crystals are arranged. The arrangement of the liquid crystals in the liquid-crystal layer is changed depending on a voltage difference between the reference voltage of the first polarization electrode 212 and the first or second driving voltage of the second polarization electrode 222.

Figure 7:
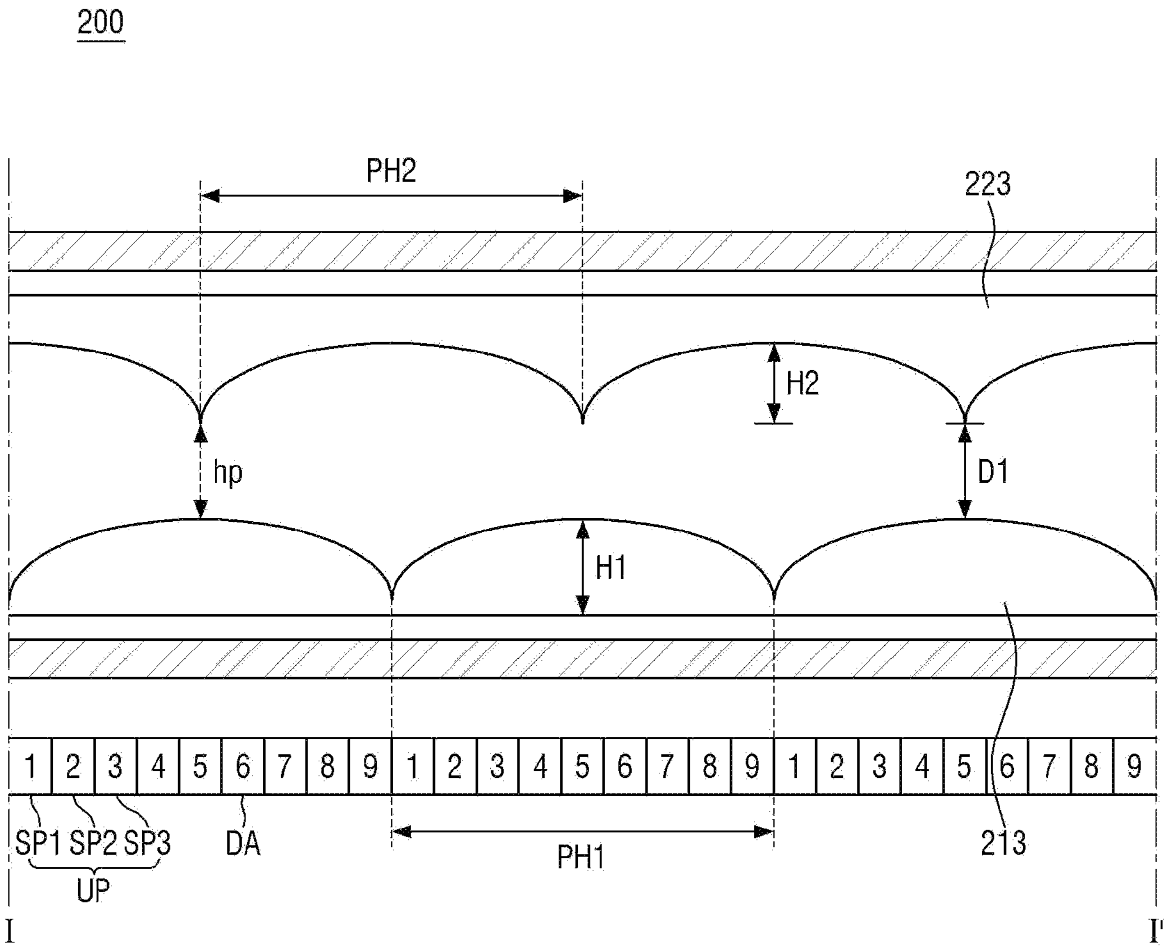
FIG. 7 is a cross-sectional view showing an arrangement structure of first and second polarization members and a polarization control layer according to an embodiment.

FIG. 7 is a cross-sectional view showing an arrangement structure of first and second polarization members and a polarization control layer according to an embodiment.

Referring to FIGS. 6 and 7, the image display light may first exit from the first anisotropic lenses 213 for each viewing point along the first refraction direction as the polarization direction is converted into the second linear polarization direction under the control of the polarization control layer 230. Alternatively, the image display light may exit for each viewing point along the second refraction direction from the second anisotropic lenses 223 as the polarization direction is converted into the first linear polarization direction under the control of the polarization control layer 230. The 2D image display light displayed through each of the sub-pixels SP1, SP2 and SP3 is continuously displayed in three dimensions as the 2D image display light alternates between the viewing points in the first refraction direction and the viewing points in the second refraction direction. Accordingly, it is possible to achieve the effect that the images are displayed with the resolution twice the resolution of the sub-pixels SP1, SP2 and SP3.

To display the viewing points in the second refraction direction differently from the viewing points in the first refraction direction while the viewing points are shifted, the arrangement structure of the first anisotropic lenses 213 of the first polarization member 210 and the second anisotropic lenses 223 of the second polarization member 220 may be different while they are shifted.

Referring to FIG. 7, each of the first anisotropic lenses 213 may be formed in a half-cylindrical, convex lens, and each of the second anisotropic lenses 223 may be formed in a half-cylindrical, concave lens.

The width PH1 of each of the first convex anisotropic lenses 213 is about equal to the width PH2 of each of the second concave anisotropic lenses 223, and the first and second anisotropic lenses 213 and 223 may have about the same length.

The maximum height H1 of each of the convex first anisotropic lenses 213 is about 0.1 μm, which may be about equal to the maximum depth H2 of each of the concave second anisotropic lenses 223. Alternatively, the maximum height H1 of each of the convex first anisotropic lenses 213 may be about 0.12 μm, which may be greater than the maximum depth H2 of each of the concave second anisotropic lenses 223 by about 0.1 μm.

To shift the viewing points in the first refraction direction and the viewing points in the second refraction direction by predetermined spacing, the first anisotropic lenses 213 and the second anisotropic lenses 223 may be shifted by about ½ spacing in the x-axis direction or the y-axis direction. For example, the lowest portions of the second anisotropic lenses 223 may be in line with the highest portions hp of the first anisotropic lenses 213. For example, the maximum depth H2 of the concave second anisotropic lenses 223 may be in line with the lowest portions of the first anisotropic lenses 213.

To keep the viewing points of the first refraction direction and the viewing points of the second refraction direction at a predetermined spacing, the distance D1 between the first anisotropic lenses 213 and the second anisotropic lenses 223 may be maintained to be about equal to the maximum height H1 of the convex first anisotropic lenses 213. Alternatively, the distance D1 between the first anisotropic lenses 213 and the second anisotropic lenses 223 may be maintained to be greater than the maximum height H1 of the convex first anisotropic lenses 213 depending on the manner in which the spacing between the viewing points is adjusted.

Figure 8:
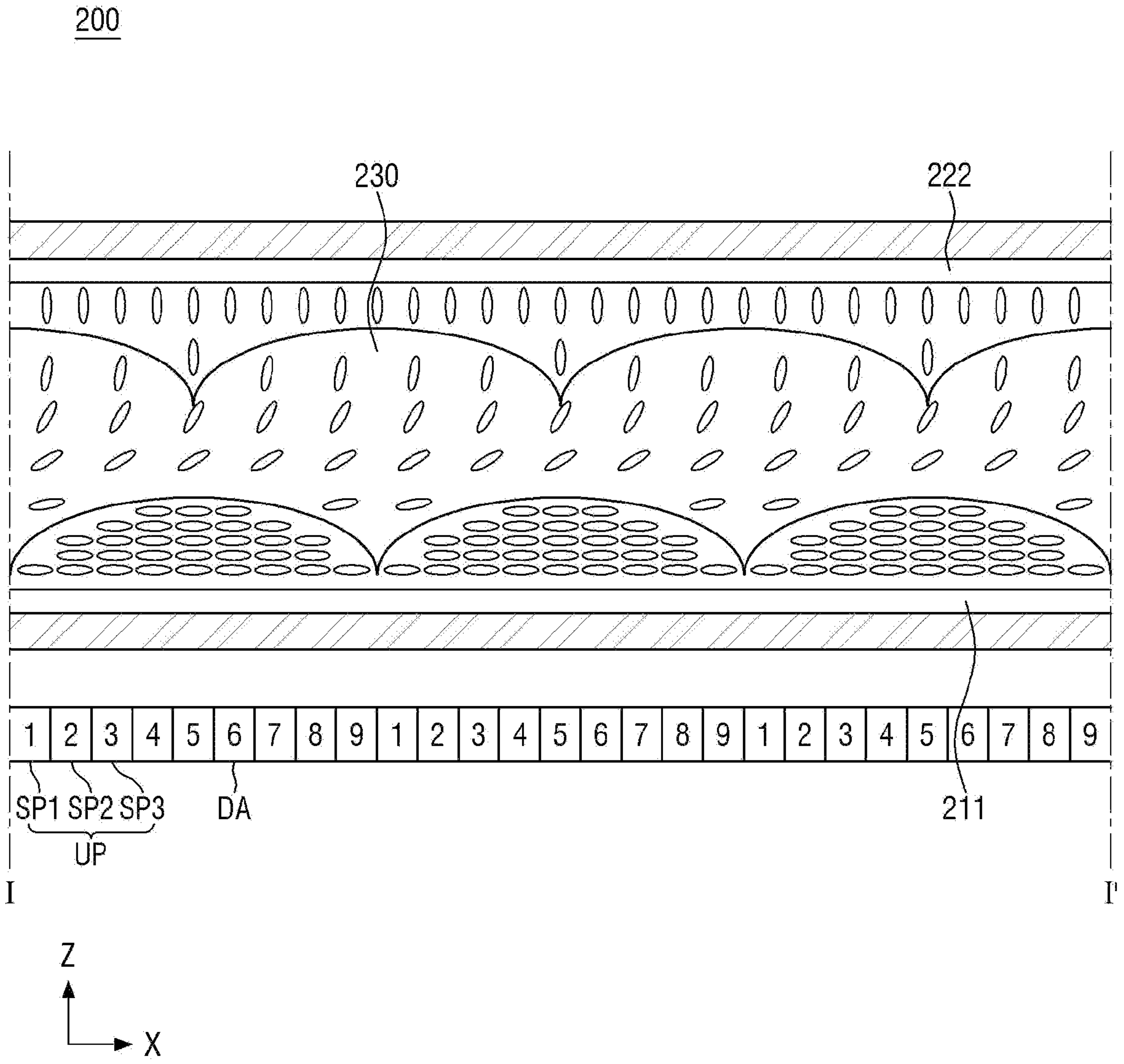
FIG. 8 is a cross-sectional view showing a polarization conversion structure of first and second polarization members and a polarization control layer according to an embodiment.

FIG. 8 is a cross-sectional view showing a polarization conversion structure of first and second polarization members and a polarization control layer according to an embodiment.

Referring to FIG. 8, the plurality of first anisotropic lenses 213 formed in the first polarization member 210 has refractive-index anisotropy, e.g., the refractive index of the exiting light varies depending on the direction of the first or second linear polarization incident from the rear side. To this end, the first anisotropic lenses 213 form light propagation paths in the first linear polarization direction according to the arrangement of liquid crystals or slits included therein.

The plurality of first anisotropic lenses 213 may be formed by aligning the tilt or the direction of the longer axes of liquid crystals in the first linear polarization direction and then curing the first anisotropic lenses 213. The first anisotropic lenses 223 may be formed in a hemispherical shape. Accordingly, when stereoscopic image display light is incident on the rear surface of the plurality of first anisotropic lenses 213 in the first linear polarization direction, the stereoscopic image display light incident in the first linear polarization direction passes as light is in that direction according to the refractive index in the shorter axis direction of the liquid crystals included in the plurality of first anisotropic lenses 213.

The polarization control layer 230 between the first polarization electrode 212 and the second polarization electrode 222 transmits the polarization direction of the stereoscopic image display light in the first linear polarization direction or converts the polarization direction into the second linear polarization direction depending on the voltage difference between the first polarization electrode 212 and the second polarization electrode 222, to output the polarization direction. For example, the polarization control layer 230 includes a liquid-crystal layer in which liquid crystals are arranged. The arrangement of the liquid crystals in the liquid-crystal layer, e.g., the arrangement in the longer axis direction is changed in the z-axis direction or x-axis direction by a voltage difference between the reference voltage of the first polarization electrode 212 and the first or second driving voltage.

The plurality of second anisotropic lenses 223 may be formed by aligning the direction of the longer axes of liquid crystals, or the direction of arrangement of the slits in the second linear polarization direction, and then curing the second anisotropic lenses 223. The second anisotropic lenses 223 may be formed as plurality of concave lenses.

When stereoscopic image display light is incident on the rear surface of the second anisotropic lenses 223 in the second linear polarization direction, the stereoscopic image display light incident in the second linear polarization direction passes as the light is in that direction according to the refractive index in the shorter axis direction of the liquid crystals included in the second anisotropic lenses 223. As a result, the light exit direction of the stereoscopic image display light output in the first refraction direction is also maintained. On the other hand, when the polarization control layer 230 forms a light exit direction in the first linear polarization direction, which is the direction of the shorter axis of the liquid crystals, and the image display light is incident on the rear surface of the second anisotropic lenses 223 in the first linear polarization direction, the light is refracted in the second refraction direction by the plurality of second anisotropic lenses 223.

Figure 9:
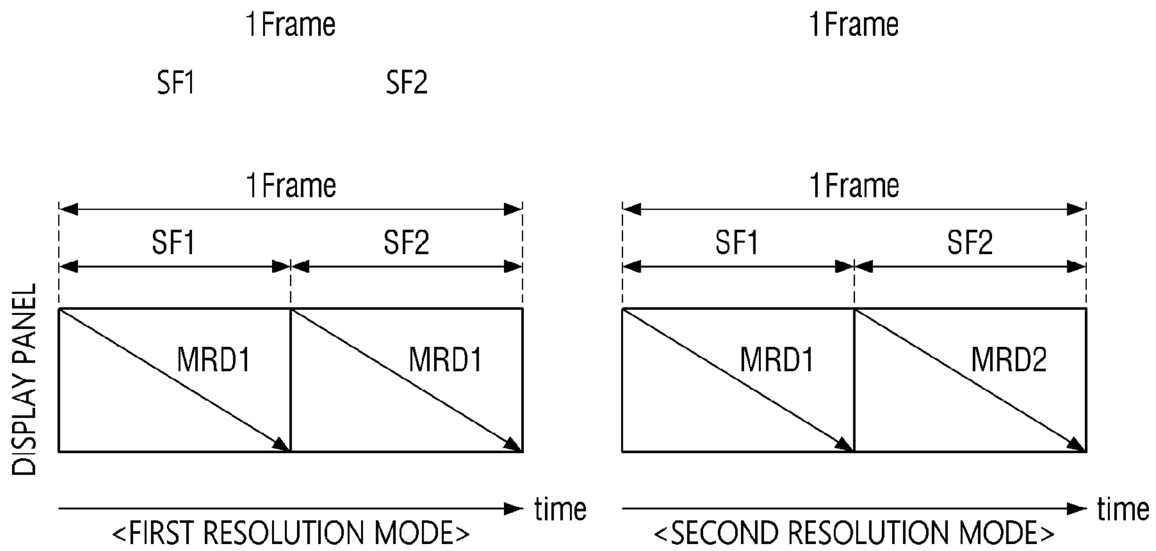
FIG. 9 is a diagram showing image display timings of time-division frames for each of first and second resolution modes according to an embodiment.

FIG. 9 is a diagram showing image display timings of time-division frames for each of first and second resolution modes according to an embodiment.

Referring to FIG. 9, the display driver 120 may divide each first frame 1 Frame into first and second sub-frames SF1 and SF2 even during an image display period in the first resolution mode for displaying 3D stereoscopic images at the first resolution, and may supply the first 3D image data voltages MRD1 for displaying 3D stereoscopic images to the data lines of the display panel 110 in the first and second sub-frames SF1 and SF2. Accordingly, the display panel 110 may be driven at the frequency twice the input frame frequency. The frame frequency is about 60 Hz for the National Television Standards Committee (NTSC), and is about 50 Hz for the Phase-Alternating Line (PAL) specifications. For example, the frame frequency of the display panel 110 may be driven at about 120 Hz, which is twice the frame frequency of the input image for the NTSC.

During the image display period in the second resolution mode for displaying 3D stereoscopic images at a second resolution that is twice the first resolution, the display driver 120 supplies the first and second 3D image data voltages MRD1 and MRD2 for displaying 3D stereoscopic images for each of the first and second sub-frames SF1 and SF2 to the data lines of the display panel 110. The first and second 3D image data voltages MRD1 and MRD2 may be the same or different image data.

TABLE 1

| | First Resolution Mode | | Second Resolution Mode | |
|---|---|---|---|---|
| | SF1 | SF2 | SF1 | SF2 |
| 212 | 0 V | 0 V | 0 V | 0 V |
| 222 | 0 V (5 V) | 0 V (5 V) | 0 V (5 V) | 25 V |

Referring to FIG. 9 and Table 1, in the first resolution mode, in the first and second sub-frames SF1 and SF2, a reference voltage of a low-level (a voltage of about −5 V to about 10 V) is equally applied to the first and second polarization electrodes 212 and 222 from the power supply. Accordingly, during the first and second sub-frames SF1 and SF2 in the first resolution mode, the polarization control layer 230 forms a light exit direction in the first linear polarization direction, which is the shorter axis direction of liquid crystals, like the plurality of first anisotropic lenses 213.

During the first and second sub-frames SF1 and SF2, since the polarization control layer 230 maintains the light exit direction in the first linear polarization direction, the refraction direction of the image display light does not change and remains in the first or second refraction direction. Accordingly, in the first resolution mode, the resolution of the display device 290 is maintained at the first resolution without changing.

On the other hand, in the second resolution mode, a reference voltage having the low-level (a voltage of about 0 V to about 5 V) may be equally applied from the power supply to the first and second polarization electrodes 212 and 222 in the first sub-frame SF1. During the first sub-frame SF1, the polarization control layer 230 may form a light exit direction in the first linear polarization direction, which is the shorter axis direction of the liquid crystals, like the plurality of first anisotropic lenses 213.

In the second sub-frame SF2, a first or second driving voltage having the high-level voltage may be applied from the power supply to the second polarization electrode 222. The first driving voltage may range from about 15 V to about 30 V higher than the reference voltage, and the second driving voltage may be equal to or greater than about 31 V higher than the first driving voltage. Accordingly, during the second sub-frame SF2, the polarization control layer 230 may form a light exit direction in the second linear polarization direction, which is the longer axis direction of the liquid crystals, unlike the plurality of first anisotropic lenses 213. The viewing point of an image is changed by changing the refraction direction of the image display light into the first or second refraction direction. As the stereoscopic image display light is continuously displayed as the light alternates between the viewing points in the first refraction direction and the viewing points in the second refraction direction in each of the first and second sub-frames SF1 and SF2, it is possible to achieve the effect that the images are displayed with the resolution twice the resolution of the sub-pixels SP1, SP2 and SP3.

Figure 10:
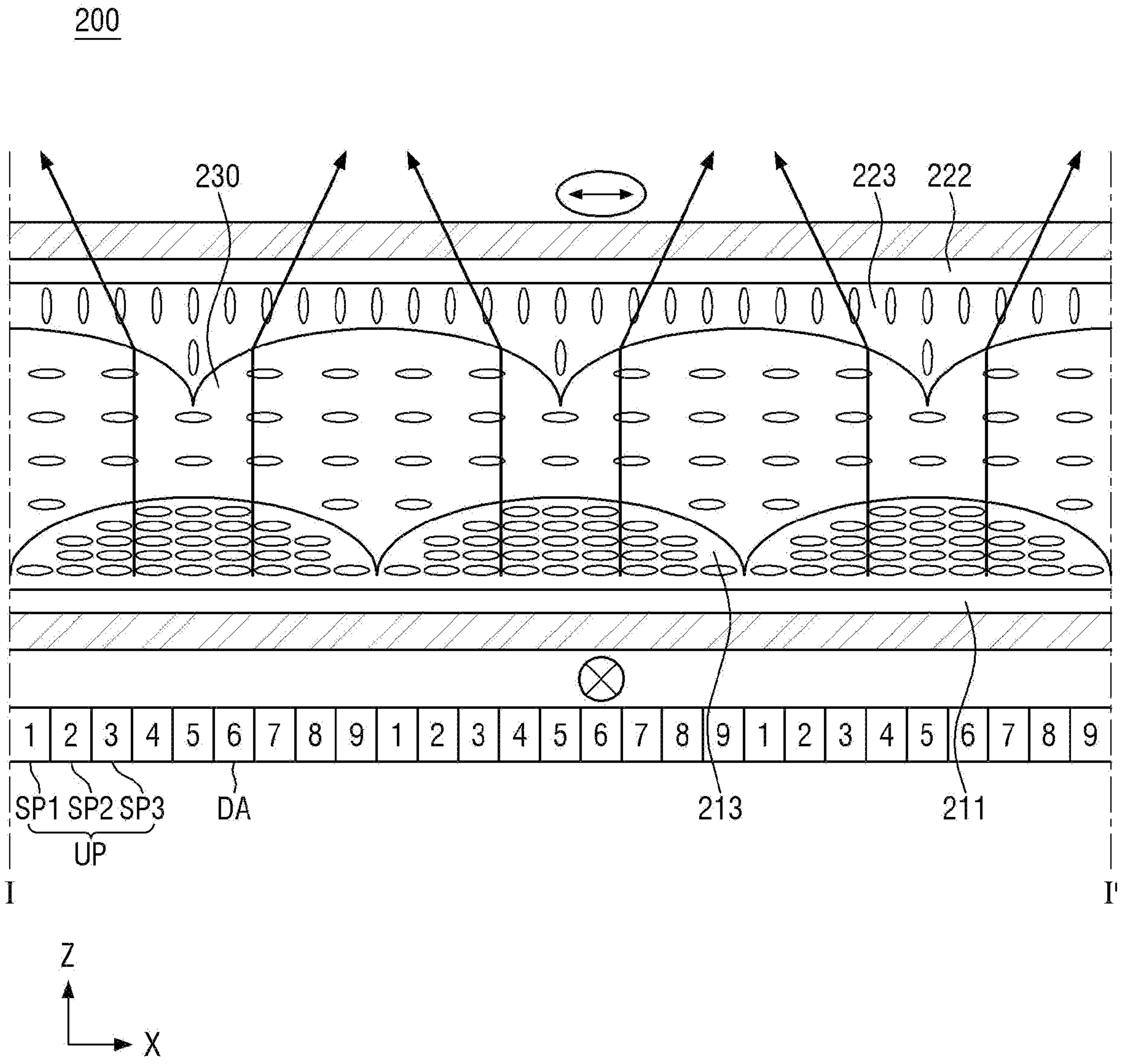
FIG. 10 is a cross-sectional view showing light exit paths of an optical member in a first resolution mode and a first time-division frame according to an embodiment.

FIG. 10 is a cross-sectional view showing light exit paths of an optical member in a first resolution mode and a first time-division frame according to an embodiment.

During the first sub-frame SF1, when a reference voltage having the low-level (a voltage of about −5 V to about 10 V) is equally applied to the first and second polarization electrodes 212 and 222, the polarization control layer 230 forms a light exit direction in the first linear polarization direction, which is the shorter axis direction of liquid crystals, like the plurality of first anisotropic lenses 213.

When the polarization control layer 230 forms a light exit direction in the first linear polarization direction, which is the direction of the shorter axis of the liquid crystals, and the stereoscopic image display light is incident on the rear surface of the second anisotropic lenses 223 in the first linear polarization direction, the light is refracted in the second refraction direction by the plurality of second anisotropic lenses 223. That is, by forming paths in the first linear polarization direction, the stereoscopic image display light incident on the rear surface of the second anisotropic lenses 223 is converted into the second linear polarization direction according to the refractive index of the liquid crystals included in the second anisotropic lenses 223 in the shorter axis direction. At this time, the light is refracted in the second refraction direction along the second linear polarization direction from the surface of the second anisotropic lenses 223, which is the boundary between the polarization control layer 230 and the second anisotropic lenses 223.

Figure 11:
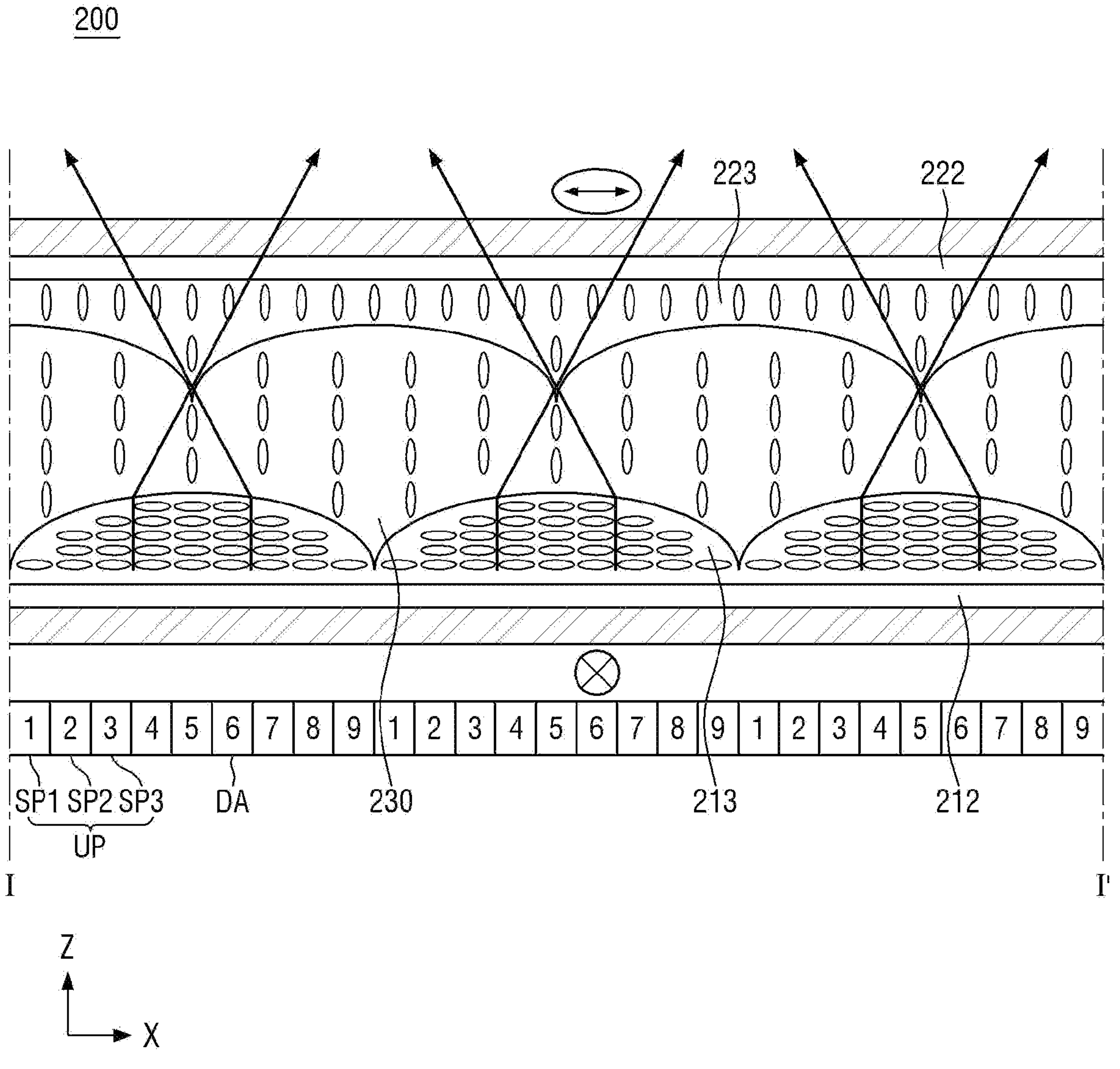
FIG. 11 is a cross-sectional view showing light exit paths of the optical member during a second time-division frame in a second resolution mode according to an embodiment.

FIG. 11 is a cross-sectional view showing light exit paths of the optical member during a second time-division frame in a second resolution mode.

In the second sub-frame SF2, a first or second driving voltage having the high-level voltage may be applied to the second polarization electrode 222. Accordingly, during the second sub-frame SF2, the polarization control layer 230 may form the light exit direction in the second linear polarization direction, which is the longer axis direction of the liquid crystals, unlike the plurality of first anisotropic lenses 213. In other words, unlike the plurality of first anisotropic lenses 213, the polarization control layer 230 may convert the light exit direction into the second linear polarization direction by the voltage difference between the reference voltage of the first polarization electrode 212 and the first driving voltage of the second polarization electrode 222.

As being converted by the polarization control layer 230 into the second linear polarization direction, the stereoscopic image display light is refracted into the first refraction direction along the first linear polarization direction on the surfaces of the plurality of first anisotropic lenses 213.

As such, the refraction direction of the image display light is changed into the first or second refraction direction in each of the first and second sub-frames SF1 and SF2, so that the viewing point of the image is changed. As the stereoscopic image display light is continuously displayed as the light alternates between the viewing points in the first refraction direction and the viewing points in the second refraction direction in each of the first and second sub-frames SF1 and SF2, it is possible to achieve the effect that the images are displayed with the resolution twice the resolution of the sub-pixels SP1, SP2 and SP3.

Figure 12:
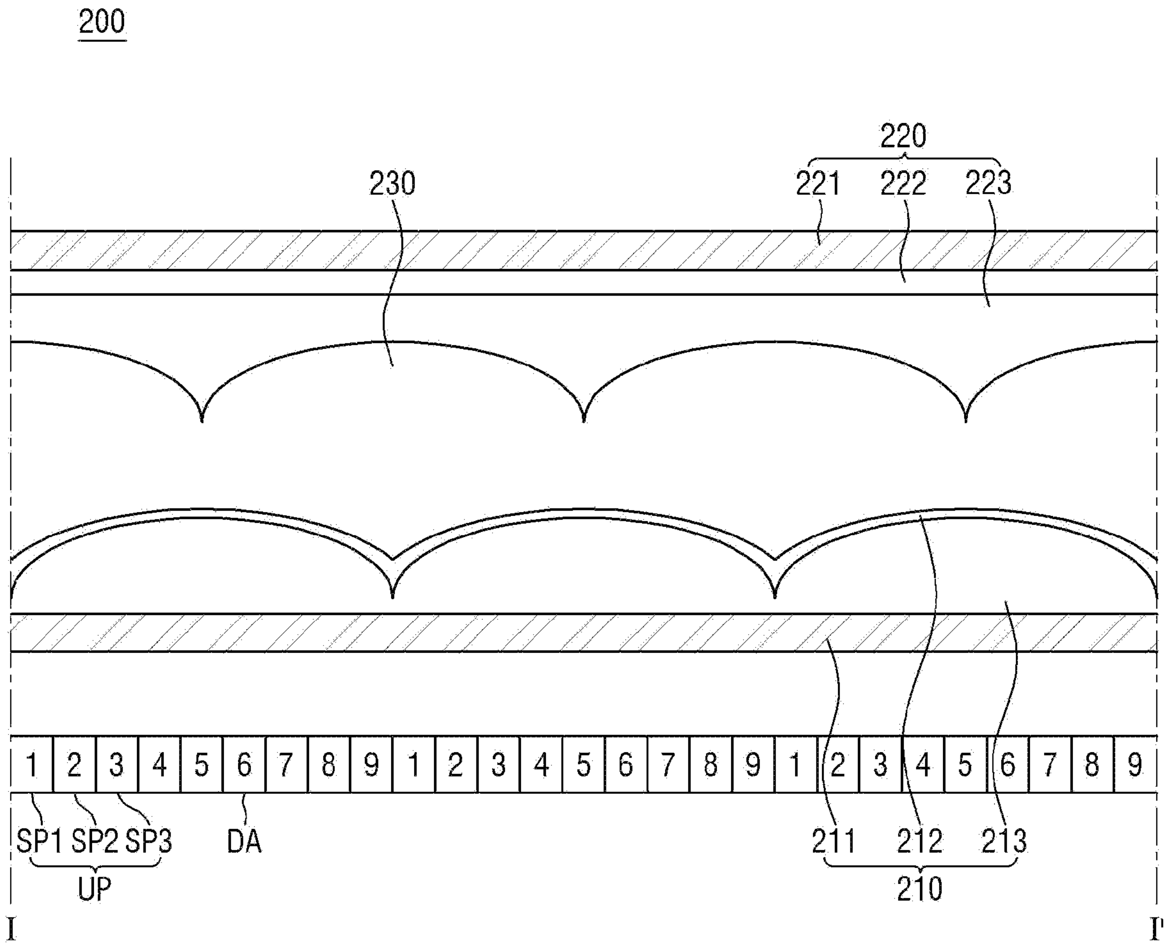
FIG. 12 is a cross-sectional view showing the sub-pixels and the optical member according to an embodiment, taken along line I-I' shown in FIG. 5.

FIG. 12 is a cross-sectional view showing the sub-pixels and the optical member according to an embodiment, taken along line I-I' shown in FIG. 5.

Referring to FIG. 12, a plurality of first anisotropic lenses 213 may be formed on the front side of the first base substrate 211 to cover the entire front surface of the first base substrate 211. The first polarization electrode 212 may be formed on the front surface of the first anisotropic lenses 213 to cover all of the first anisotropic lenses 213 disposed on the first base substrate 211.

Since the first polarization electrode 212 is formed on the front surface of the first anisotropic lenses 213, the distance between the first polarization electrode 212 and the second polarization electrode 222 may be partially decreased by the height or thickness of the first anisotropic lenses 213.

As the distance between the first polarization electrode 212 and the second polarization electrode 222 is partially decreased, the voltage level of the first or second driving voltage applied to the first polarization electrode 212 may be decreased.

Figure 13:
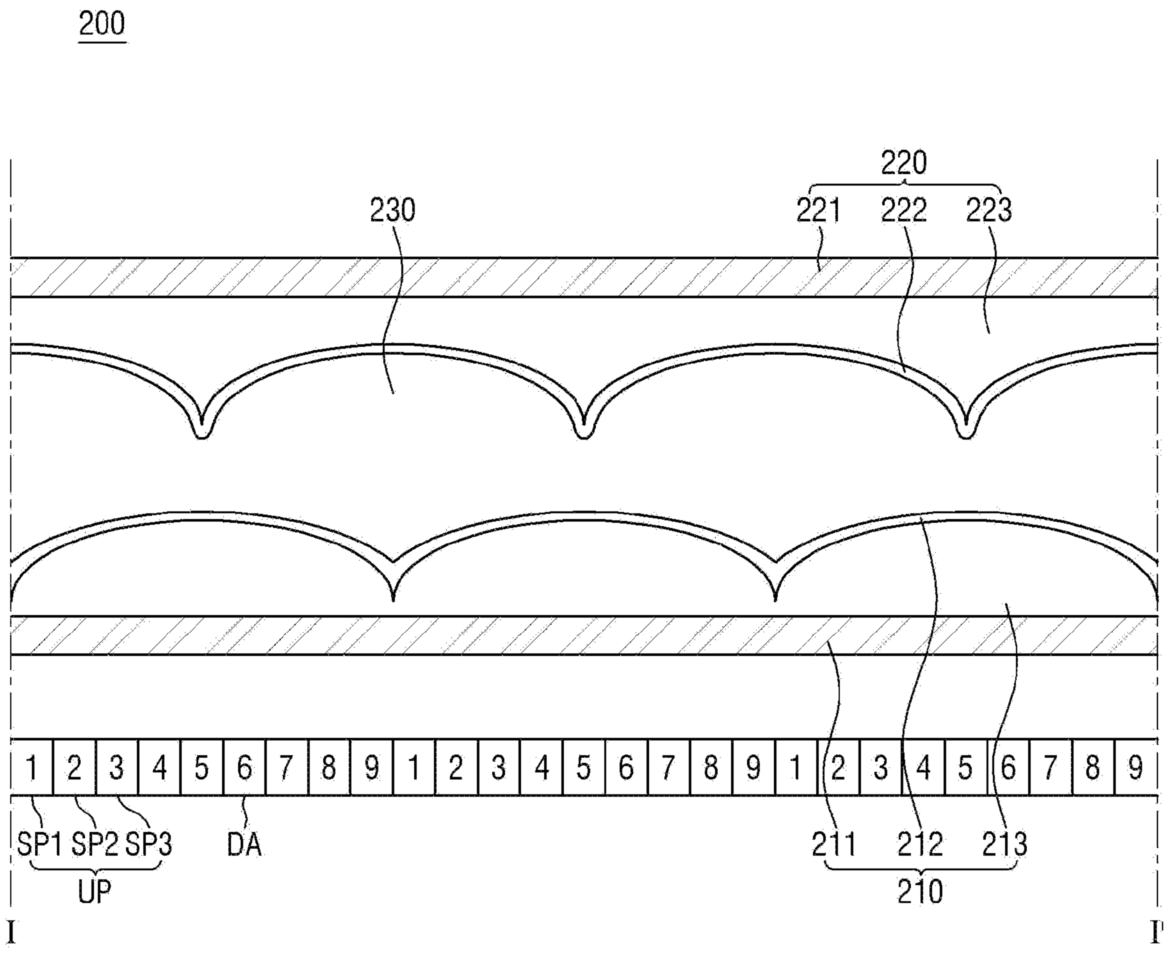
FIG. 13 is a cross-sectional view showing the sub-pixels and the optical member according to an embodiment, taken along line I-I' shown in FIG. 5.

FIG. 13 is a cross-sectional view showing the sub-pixels and the optical member according to an embodiment, taken along line I-I' shown in FIG. 5.

Referring to FIG. 13, the second polarization electrode 222 may be disposed on the rear side of the second anisotropic lenses 223 and may cover the entire light incident surface of the second anisotropic lenses 223 disposed on the rear surface of the second base substrate 221.

Since the second polarization electrode 223 is formed on the rear surface of the second anisotropic lenses 223, the distance between the first polarization electrode 212 and the second polarization electrode 222 may be partially further decreased.

As the distance between the first polarization electrode 212 and the second polarization electrode 222 is partially decreased, the voltage level of the first or second driving voltage applied to the first polarization electrode 212 may be decreased.

Figure 14:
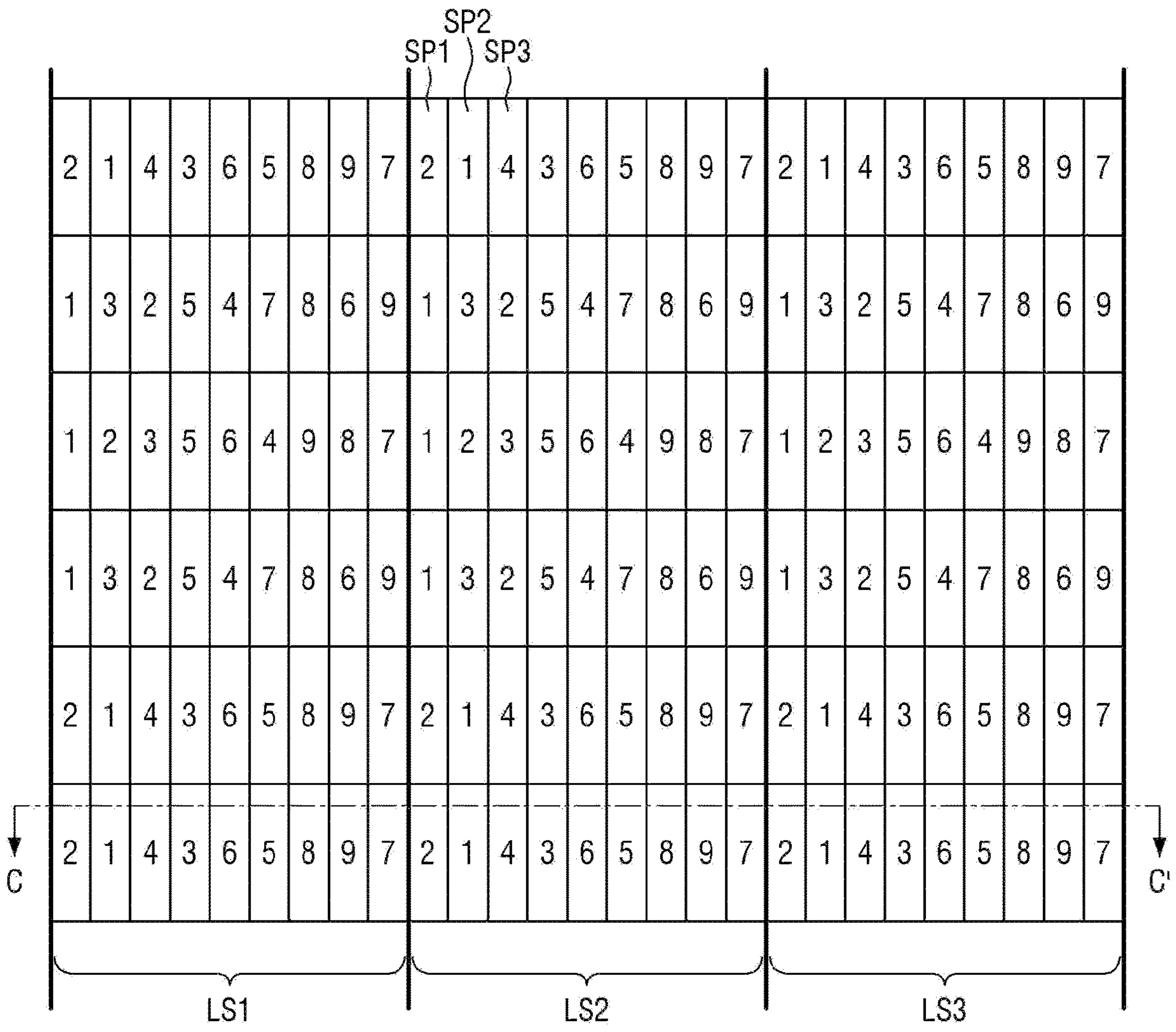
FIG. 14 is a view for showing a method of correcting viewing point information for each sub-pixel according to an embodiment.
Figure 15:
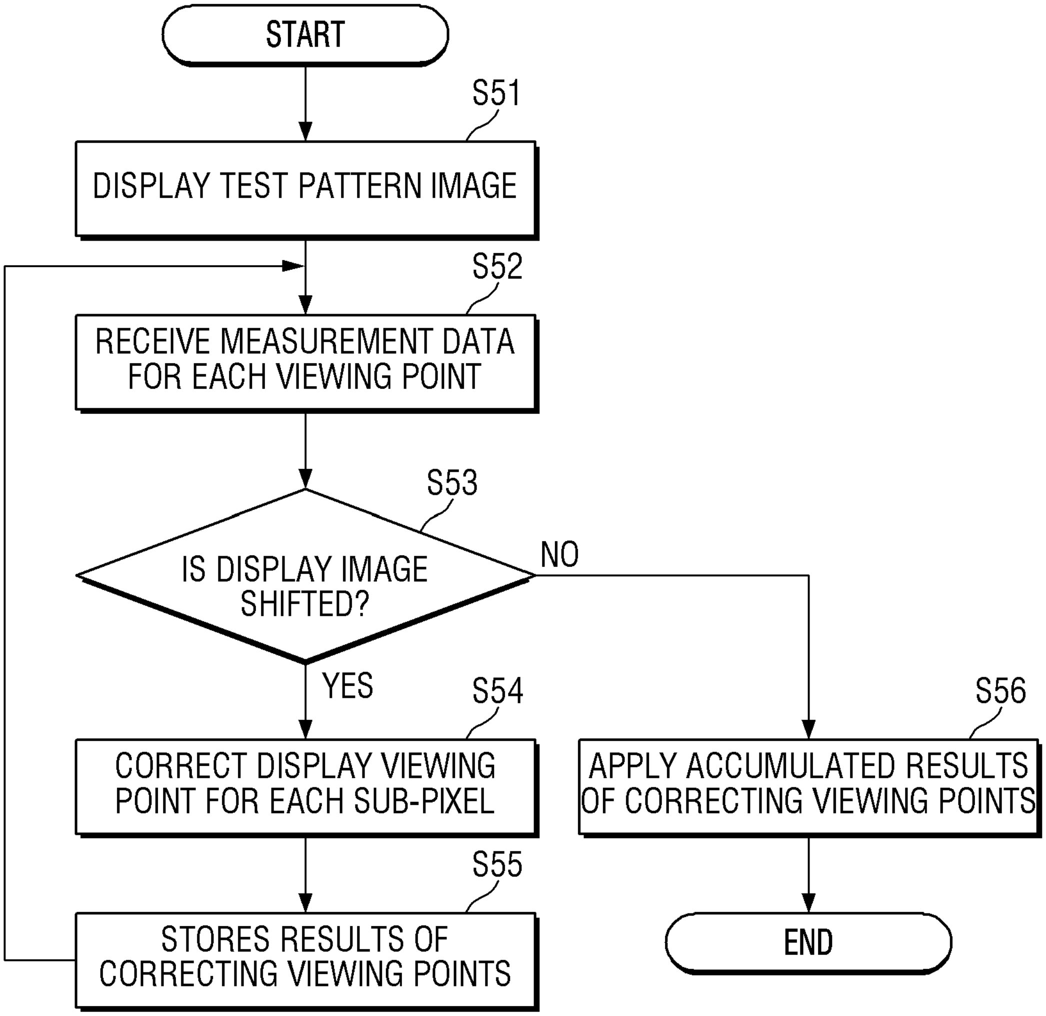
FIG. 15 is a flowchart illustrating the method of correcting viewing point information for each sub-pixel of FIG. 14 according to an embodiment.

FIG. 14 is a view for showing a method of correcting viewing point information for each sub-pixel according to an embodiment. FIG. 15 is a flowchart illustrating the method of correcting viewing point information for each sub-pixel of FIG. 14 according to an embodiment.

In the second resolution mode, while the stereoscopic image display light is alternately displayed between viewing viewpoints in the first and second refraction directions in the first and second sub-frames SF1 and SF2, the viewing points may be shifted for each of the sub-pixel SP1, SP2 and SP3. For example, the viewing points may be shifted for each of the sub-pixels SP1, SP2 and SP3 according to the orientation or tilt error of liquid crystals, an alignment error between the first and second anisotropic lenses 213 and 223, etc.

To correct the viewing point information for each of the sub-pixels SP1, SP2 and SP3, the display device 290 may be tested by a separate test apparatus.

In correcting the viewing point information for each of the sub-pixels SP1, SP2 and SP3, the display device 290 is mounted on the test apparatus and displays 3D stereoscopic image of a predetermined test pattern (operation S51).

The display device 290 displays a test pattern image by driving sub-pixels SP1, SP2 and SP3 assigned viewing point numbers for different viewing points. The viewing points of the display device 290 may be designated based on the relative positions of the sub-pixels with respect to each of the first anisotropic lenses 213.

The test apparatus detects optical properties including illuminance and luminance values of the test pattern image displayed on the display device 290 for each frame. Then, the test apparatus detects and analyzes grayscale values and luminance values in units of sub-pixels, and analyzes the amount of crosstalk for each viewing point. For example, the test apparatus sorts the grayscale values and luminance values for each sub-pixel, and derives results of analyzing crosstalk for each viewing point according to changes in the grayscale values and luminance values for each sub-pixel. In doing so, the results of analyzing crosstalk for each viewing point can be derived using a predetermined crosstalk analysis algorithm or mathematical relationship. Subsequently, the test apparatus may compare and analyze the results of analyzing crosstalk for each viewing point to calculate the measurement data for each viewing point of the display device 290. For example, the test apparatus analyzes the average luminance value of the rest of viewing points relative to the luminance value for each viewing point. Then, the test apparatus compares the luminance value for each viewing point with the average luminance value of the rest of the viewing points. The test apparatus may extract or calculate measurement data for each viewing point to reduce a difference value between the luminance value for each viewing point and the average luminance value of the rest of the viewing points. In this instance, the measurement data for each viewing point may be set in an inverse proportion to the difference value between the optical property value for each viewing point and the average of the rest of the viewing points. The measurement data for each viewing point may be set in advance based on a number of experimental results and calculation results in a database.

The display driver 120 receives and stores the measurement data for each viewing point from the test apparatus, and as a result, crosstalk may be reduced (operation S52). In addition, the display driver 120 determines whether the image displayed by each of the sub-pixels SP1, SP2 and SP3 is shifted based on the results of comparing the relative position of each of the sub-pixels SP1, SP2 and SP3 and the measurement data for each viewing point, e.g., the difference in the measurement data for each of the sub-pixels SP1, SP2 and SP3 (operation S53). Based on the difference in the measurement data of adjacent ones of the sub-pixels SP1, SP2 and SP3, it may be determined whether the images of the sub-pixels SP1, SP2 and SP3 are shifted.

Figure 16:
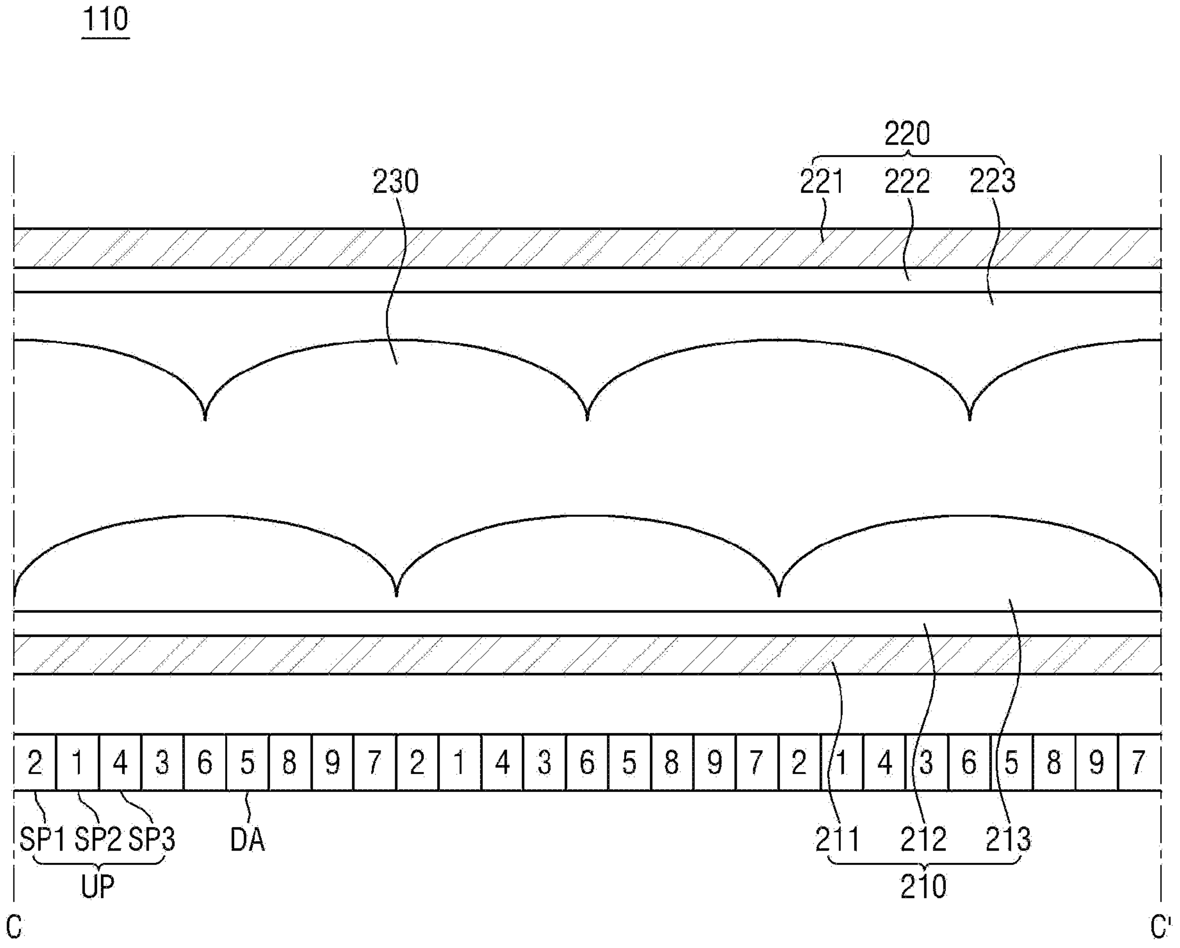
FIG. 16 is a cross-sectional view showing the sub-pixels and the optical member according to an embodiment, taken along line C-C' shown in FIG. 14.

FIG. 16 is a cross-sectional view showing the sub-pixels and the optical member according to an embodiment, taken along line C-C' shown in FIG. 14.

Referring to FIGS. 14 and 16, when checking results of shifting the sub-pixels SP1, SP2 and SP3, the display driver 120 corrects viewing point numbers for each of the sub-pixels SP1, SP2 and SP3 so that the difference in the measurement data between adjacent sub-pixels SP1, SP2 and SP3 is reduced (operation S54). Then, the display driver 120 stores the results of correcting the viewing point numbers for each of the sub-pixels SP1, SP2 and SP3 (operation S55). Subsequently, the display driver 120 corrects the viewing point numbers for each of the sub-pixels SP1, SP2 and SP3, and drives the sub-pixels SP1, SP2 and SP3 so that 3D stereoscopic images of the test pattern are displayed in the sub-pixels SP1, SP2 and SP3 according to the corrected viewing points.

The test may be repeated. The display driver 120 may repeatedly correct the viewing point number for each of the sub-pixels SP1, SP2 and SP3 while the test is repeated, and may apply the accumulated results to finally designate and store the viewing point numbers for each of the sub-pixels SP1, SP2 and SP3 (operation S56).

Figure 18:
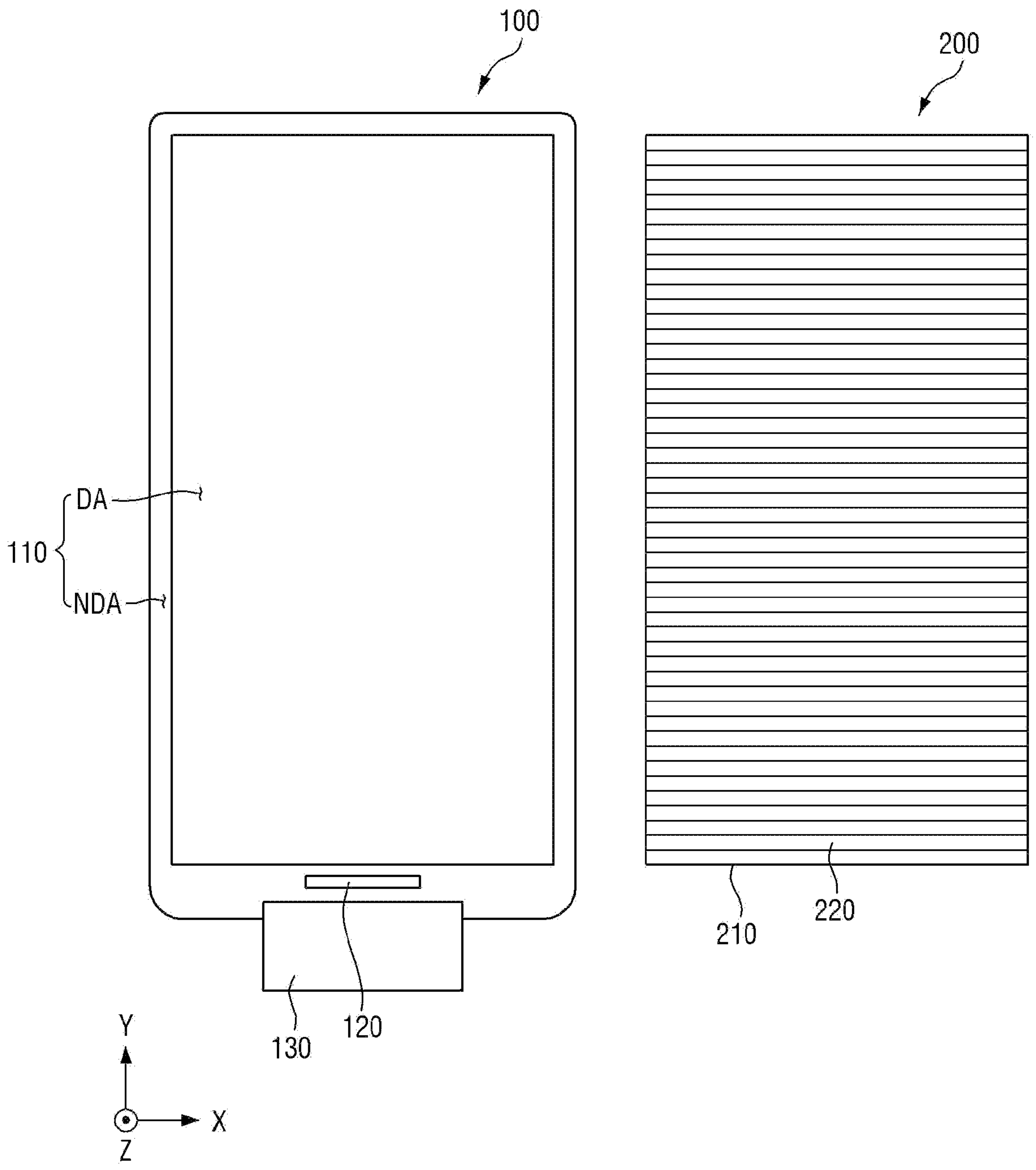
FIG. 18 is a plan view showing a display panel and an optical member shown in FIG. 17 according to an embodiment.

FIG. 17 is an exploded perspective view showing a display device according to an embodiment of the present disclosure. FIG. 18 is a plan view showing the display panel and the optical member shown in FIG. 17 according to an embodiment.

Referring to FIGS. 17 and 18, a display device 290 according to an embodiment may be implemented as a flat-panel display device such as, for example, an organic light-emitting display (OLED), and may be a 3D display including the display module 100 and the optical member 200.

The display module 100 may include a display panel 110, a display driver 120, and a circuit board 130.

The display panel 110 may include a display area DA and a non-display area NDA. The display area DA may include data lines, scan lines, supply voltage lines, and a plurality of pixels connected to the data lines and scan lines.

The optical member 200 may be disposed on the display module 100. The optical member 200 may be attached to one surface of the display module 100 through an adhesive member. The optical member 200 may be attached to the display module 100 by a panel bonding apparatus. For example, the optical member 200 may be implemented as a lenticular lens sheet including the first anisotropic lenses LS1, LS2 and LS3.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:

a display panel configured to display a plurality of 2D images;

an optical member configured to refract 2D image display light displayed in a display area of the display panel into a first refraction direction or a second refraction direction to output 3D stereoscopic image display light; and a display driver configured to control a refraction direction of the 3D stereoscopic image display light by dividing a 3D stereoscopic image display period of at least one frame into first and second time-division frames and supplying driving voltages to the optical member in each of the first and second time-division frames to cause light exit paths of the 3D stereoscopic image display light in the first time-division frame to differ from light exit paths of the 3D stereoscopic image display light in the second time-division frame.

2. The display device of claim 1, wherein the optical member comprises:

a first polarization member configured to output the 2D image display light displayed in the display area in a first linear polarization direction;

a polarization control layer configured to output the 2D image display light in the first linear polarization direction incident through the first polarization member in the first linear polarization direction without change, or to output the 2D image display light as 3D stereoscopic image display light by converting a polarization direction of the 2D image display light into a second linear polarization direction; and a second polarization member configured to output the 2D image display light as the 3D stereoscopic image display light by converting the polarization direction of the 2D image display light in the first linear polarization direction incident through the polarization control layer into the second linear polarization direction, or to output the 3D stereoscopic image display light incident in the second linear polarization in the second linear polarization direction without change.

3. The display device of claim 2, wherein the first polarization member comprises:

a first base substrate;

a plurality of first anisotropic lenses configured to output the 2D image display light, which is incident through the first base substrate, in the first linear polarization direction; and a first polarization electrode disposed on a front side of the first base substrate, wherein the first polarization electrode covers an entire front surface of the first base substrate, or is formed on a front side of the plurality of first anisotropic lenses and covers all of the plurality of first anisotropic lenses which are disposed on the front surface of the first base substrate.

4. The display device of claim 3, wherein each of the plurality of first anisotropic lenses is formed in a half-cylindrical shape and forms a light propagation path in the first linear polarization direction according to an arrangement of liquid crystals or slits included in each of the plurality of first anisotropic lenses, and outputs the 2D image display light in the first or second linear polarization direction incident through the first base substrate in the first linear polarization direction.

5. The display device of claim 4, wherein the polarization control layer outputs the 2D image display light in the first linear polarization direction incident through the plurality of first anisotropic lenses in the first linear polarization direction without change, or converts the polarization direction of the 2D image display light into the second linear polarization direction so that the 2D image display light is refracted in the first refraction direction along the first linear polarization direction at a boundary between the plurality of first anisotropic lenses and the polarization control layer.

6. The display device of claim 3, wherein the second polarization member comprises:

a second base substrate;

a plurality of second anisotropic lenses disposed on a rear side of the second base substrate and configured to output the 3D stereoscopic image display light incident through the polarization control layer in the second linear polarization direction; and a second polarization electrode disposed on the rear side of the second base substrate and covering an entire rear surface of the second base substrate, or formed on a rear side of each of the plurality of second anisotropic lenses and covering all of the plurality of second anisotropic lenses which are disposed on the rear surface of the second base substrate.

7. The display device of claim 6, wherein each of the plurality of second anisotropic lenses is formed in a semi-circular concave lens shape and forms a light propagation path in the second linear polarization direction according to an arrangement of liquid crystals or slits included in each of the plurality of second anisotropic lenses, and outputs the 3D stereoscopic image display light incident through the first polarization control layer in the second linear polarization direction as the 3D stereoscopic image display light or as the 2D image display light by converting the second linear polarization direction into the first linear polarization direction.

8. The display device of claim 7, wherein the plurality of second anisotropic lenses outputs the 3D stereoscopic image display light in the second linear polarization direction incident through the polarization control layer in the first refraction direction without change, and converts the 2D image display light in the first linear polarization direction incident through the polarization control layer into the second linear polarization direction so that the 2D image display light is refracted in the second refraction direction along the second linear polarization direction and is output as the 3D stereoscopic image display light.

9. The display device of claim 6, wherein the display driver supplies a reference voltage of a predetermined low-level equally to the first and second polarization electrodes during the first time-division frame among the first and second time-division frames, and supplies the reference voltage to the first polarization electrode and a predetermined driving voltage to the second polarization electrode during the second time-division frame among the first and second time-division frames.

10. The display device of claim 9, wherein the polarization control layer outputs the 2D image display light in the first linear polarization direction incident through the plurality of first anisotropic lenses in the first linear polarization direction without change by a voltage difference between the reference voltage and the predetermined driving voltage, or converts the polarization direction of the 2D image display light into the second linear polarization direction so that the 2D image display light is refracted in the first refraction direction along the first linear polarization direction at a boundary between the plurality of first anisotropic lenses and the polarization control layer.

11. The display device of claim 10, wherein the plurality of second anisotropic lenses outputs the 3D stereoscopic image display light in the second linear polarization direction incident through the polarization control layer in the first refraction direction without change, and converts the 2D image display light in the first linear polarization direction incident through the polarization control layer into the second linear polarization direction so that the 2D image display light is refracted in the second refraction direction along the second linear polarization direction and is output as the 3D stereoscopic image display light.

12. The display device of claim 6, wherein each of the first anisotropic lenses is convex and each of the second anisotropic lenses is concave, wherein a width and a length of each of the plurality of first anisotropic lenses are equal to a width and a length of each of the plurality of second anisotropic lenses, and wherein a maximum height of each of the first anisotropic lenses is equal to or greater than a maximum depth of each of the second anisotropic lenses.

13. The display device of claim 12, wherein the plurality of first anisotropic lenses and the plurality of second anisotropic lenses face each other and are shifted by about ½ spacing in either direction of an x-axis direction or a y-axis direction, and are arranged such that lowest portions of the plurality of second anisotropic lenses are in line with highest portions of the first anisotropic lenses.

14. The display device of claim 12, wherein a distance between the plurality of first anisotropic lenses and the plurality of second anisotropic lenses facing each other is equal to or greater than the maximum height of each of the first anisotropic lenses.

15. A display device, comprising:

an optical member configured to refract 2D image display light displayed in a display area of a display panel in a first refraction direction or a second refraction direction, wherein the optical member comprises:

a first polarization member configured to output the 2D image display light displayed in the display area in a first linear polarization direction;

a polarization control layer configured to output the 2D image display light as 3D stereoscopic image display light by converting a polarization direction of the 2D image display light into a second linear polarization direction; and a second polarization member configured to output the 2D image display light as the 3D stereoscopic image display light by converting the polarization direction of the 2D image display light in the first linear polarization direction incident through the polarization control layer into the second linear polarization direction.

16. The display device of claim 15, further comprising:

a display driver configured to control a refraction direction of the 3D stereoscopic image display light by dividing a 3D stereoscopic image display period of at least one frame into first and second time-division frames and supplying a driving voltage to the second polarization member for each of the first and second time-division frames to cause light exit paths of the 3D stereoscopic image in the first time-division frame to differ from light exit paths of the 3D stereoscopic image in the second time-division frame.

17. The display device of claim 16, wherein the first polarization member comprises:

a first base substrate;

a plurality of first anisotropic lenses configured to output the 2D image display light, which is incident through the first base substrate, in the first linear polarization direction; and a first polarization electrode disposed on a front side of the first base substrate, wherein the first polarization electrode covers an entire front surface of the first base substrate, or is formed in a front side of the plurality of first anisotropic lenses and covers all of the plurality of first anisotropic lenses which are disposed on the front surface of the first base substrate.

18. The display device of claim 17, wherein the second polarization member comprises:

a second base substrate;

a plurality of second anisotropic lenses disposed on a rear side of the second base substrate and configured to convert a polarization direction of the 2D image display light or the 3D stereoscopic image display light incident through the polarization control layer into the second linear polarization direction and output the 2D image display light or the 3D stereoscopic image display light; and a second polarization electrode disposed on the rear side of the second base substrate and covering an entire rear surface of the second base substrate, or formed on a rear side of each of the plurality of second anisotropic lenses and covering all of the plurality of second anisotropic lenses which are disposed on the rear surface of the second base substrate.

19. The display device of claim 18, wherein the polarization control layer outputs the 2D image display light in the first linear polarization direction incident through the plurality of first anisotropic lenses in the first linear polarization direction without change by a voltage difference between a reference voltage and the driving voltage, or converts the polarization direction of the 2D image display light into the second linear polarization direction so that the 2D image display light is refracted in the first refraction direction along the first linear polarization direction at a boundary between the plurality of first anisotropic lenses and the polarization control layer and is output as the 3D stereoscopic image display light.

20. The display device of claim 18, wherein the plurality of second anisotropic lenses outputs the 3D stereoscopic image display light in the second linear polarization direction incident through the polarization control layer in the first refraction direction without change, and converts the 2D image display light in the first linear polarization direction incident through the polarization control layer into the second linear polarization direction so that the 2D image display light is refracted in the second refraction direction along the second linear polarization direction and is output as the 3D stereoscopic image display light.

* * * * *